(12) United States Patent
Doucet et al.

(10) Patent No.: US 12,339,373 B2
(45) Date of Patent: Jun. 24, 2025

(54) IONOSPHERIC DISTURBANCE INFORMATION GENERATION METHODS AND SYSTEMS

(71) Applicant: Trimble Inc., Westminster, CO (US)

(72) Inventors: Kenneth Donald Doucet, New Brunswick (CA); Xiaoming Chen, Höhenkirchen-Siegertsbrunn (DE); Gang Lu, Westminster, CO (US)

(73) Assignee: Trimble Inc., Westminster, CO (US)

( * ) Notice: Subject to any disclaimer, the term of this patent is extended or adjusted under 35 U.S.C. 154(b) by 251 days.

(21) Appl. No.: 18/202,811

(22) Filed: May 26, 2023

(65) Prior Publication Data
US 2024/0393468 A1    Nov. 28, 2024

(51) Int. Cl.
*G01S 19/07*    (2010.01)
*G01S 19/04*    (2010.01)

(52) U.S. Cl.
CPC ............ *G01S 19/072* (2019.08); *G01S 19/04* (2013.01)

(58) Field of Classification Search
CPC ......... G01S 19/072; G01S 19/08; G01S 19/04
See application file for complete search history.

(56) References Cited

U.S. PATENT DOCUMENTS

| | | | | |
|---|---|---|---|---|
| 4,463,357 A | * | 7/1984 | MacDoran | G01S 19/14 342/26 D |
| 6,954,488 B1 | | 10/2005 | Lennen | |
| 9,395,443 B2 | * | 7/2016 | Trilles | G01S 19/40 |
| 9,557,419 B2 | * | 1/2017 | Drescher | G01S 19/074 |
| 12,276,771 B2 | * | 4/2025 | Crowley | G01S 19/07 |
| 2015/0226855 A1 | | 8/2015 | Averin et al. | |
| 2019/0056505 A1 | | 2/2019 | Morley | |
| 2021/0173090 A1 | * | 6/2021 | Wu | G01S 19/072 |

FOREIGN PATENT DOCUMENTS

| | | |
|---|---|---|
| EP | 2 746 811 A2 | 6/2014 |
| EP | 3 293 549 A1 | 3/2018 |
| EP | 3 130 943 B1 | 3/2022 |

(Continued)

OTHER PUBLICATIONS

CN 114579917 A with english translation; date filed Dec. 3, 2021; date published Jun. 3, 2022. (Year: 2022).*

(Continued)

*Primary Examiner* — Calvin Cheung
(74) *Attorney, Agent, or Firm* — Kilpatrick Townsend & Stockton LLP

(57) ABSTRACT

Some embodiments of the invention pertain to generating (s10) and providing (s20) ionospheric disturbance information from navigation satellite system (NSS) reference stations or reference station system to NSS receivers or NSS receiver systems. Station-specific and/or satellite-specific ionospheric disturbance information may be obtained (s40) on the receiver side for mitigation purposes (s60, s70, s80) in the context of estimating parameters useful to determine a position. The ionospheric disturbance information may for example comprise ionospheric amplitude scintillation information, ionospheric phase scintillation information, and/or ionospheric delay gradient information. Systems, vehicles, and computer programs are also disclosed.

18 Claims, 24 Drawing Sheets

(56) References Cited

FOREIGN PATENT DOCUMENTS

| EP | 3 035 080 B1 | 8/2022 | | |
|---|---|---|---|---|
| WO | WO-2013152200 A1 | * | 10/2013 | ............. G01V 1/008 |

OTHER PUBLICATIONS

Partial European Search Report for Application No. 23211484.3-1206, mailed Jun. 10, 2024, 17 pages.

Borries, C. et al., "Assessment of the capabilities and applicability of ionospheric perturbation indices provided in Europe," Advances in Space Research, Elsevier, Amsterdam, NL; vol. 66, No. 3, Apr. 22, 2020, pp. 546-562.

Ho, Y. H. et al., "Reduced global positioning system (GPS) positioning error by mitigating ionospheric scintillation," 2014 IEEE Symposium on Wireless Technology and Applications (ISWTA), IEEE, Sep. 28, 2014, pp. 110-115.

Heh, D. Y et al., "Equatorial Ionospheric Scintillation of BeiDou Navigation Satellite System Observed in Singapore," PNT 2015—Proceedings of the ION 2015 Pacific PNT Meeting, The Institute of Navigation, Apr. 23, 2015, pp. 17-24.

Pi, X. et al., "Monitoring of global ionospheric irregularities using the worldwide GPD network," Geophysical Research Letters, vol. 24, No. 18, pp. 2283-2286, Sep. 15, 1997, 4 pages.

Liu, Z. et al., "Study of the Ionospheric TEC Rate in Hong Kong Region and its GPS/GNSS Application", Global Navigation Satellite System: Technology Innovation and Application, 2009, pp. 129-137.

Cherniak, I. et al., "Observation of the ionospheric irregularities over the Northern Hemisphere: Methodology and service," Radio Science, 2014, pp. 653-662.

Nguyen, V. K. et al., "Measuring phase scintillation at different frequencies with conventional GNSS receivers operating at 1 Hz," Journal of Geodesy, 93, 2019, pp. 1985-2001.

Luo, X. et al., "Amplitude scintillation index derived from $C/N_0$ measurements released by common geodetic GNSS receivers operating at 1 Hz," Journal of Geodesy, 2020, 15 pages.

Wanninger, L., "Ionospheric Disturbance Indices for RTK and Network RTK Positioning," Proceedings of the $17^{th}$ International Technical Meeting of the Satellite Division of the Institute of Navigation, 2004, pp. 2849-2854.

Lee, J. et al., "Correlation between Ionospheric Spatial Decorrelation and Space Weather Intensity for Safety-Critical Differential GNSS Systems," Sensors, 19, 2019, 16 pages.

Caamano, M. et al., "Network-based ionospheric gradient monitoring to support GBAS," Navigation, 68, 2021, pp. 135-156.

Chang, H. et al., "Ionospheric spatial decorrelation assessment for GBAS daytime operations in Brazil," Navigation, 68, 2021, pp. 391-404.

Marini-Pereira, L. et al., "A Simple and Effective Approach to Real-Time Ionospheric Monitoring for GBAS in Low Latitudes," Proceedings of the $35^{th}$ International Technical Meeting of the Satellite Division of the Institute of Navigation (ION GNSS + 2022), 2022, 16 pages.

Supriadi, S. et al., "Construction of nominal ionospheric gradient using satellite pair based on GNSS CORS observation in Indonesia," Earth, Planets and Space, 74, 2022, 10 pages.

Trimble (Jun. 2009). "CMRx: A new correction format from Trimble". White paper, Trimble Navigation Ltd. Retrieved on May 17, 2023 from http://trl.trimble.com/docushare/dsweb/Get/Document-469944/WhitePaper_HeavyHighway_CMRxrev1.pdf.

Zhang, Y. et al., "A Study on the Characteristics of the Ionoshpheric Gradient under Geomagnetic Perturbations," Sensors, 20, 1805, 2020, pp. 1-19.

Frissel, N. A. et al., "First Observations of Large Scale Traveling Ionospheric Disturbances Using Automated Amateur Radio Receiving Networks," Geophyscial Research Letters, 49, 2022, pp. 1-12.

Woo, K., "Optimum Semi-Codeless Carrier Phase Tracking of L2," presented at the $12^{th}$ International Technical Meeting of the Satellite Division of the Institute of Navigation, Nashville, Tennessee, Sep. 1999, 17 pages.

Pullen, S. et al., "Impact and Mitigation of Ionospheric Anomalies on Ground-Based Augmentation of GNSS," Radio Science, vol. 44, 2009, 10 pages.

Felux, M. et al., "Ionospheric Gradient Threat Mitigation in Future Dual Frequency GBAS," International Journal of Aerospace Engineering, vol. 2017, 2017, 11 pages.

Georgiadou, Y. et al., "On the Effect of Ionospheric Delay on Geodetic Relative GPS Positioning", Manuscripta Geodaetica, vol. 13, 1988, 9 pages.

Lee, J. et al., "Ionospheric Threat Mitigation by Geometry Screening in Ground-Based Augmentation Systems," Journal of Aircraft, vol. 48, No. 4, 2011, pp. 1422-1433.

Vani, B. C. et al., "Visual Exploration and Analysis of Ionospheric Scintillation Monitoring Data: The ISMR Query Tool," Computers & Geosciences, vol. 104, 2017, pp. 125-134.

Vila-Valls, J. et al., "Survey on Signal Processing for GNSS Under Ionospheric Scintillation: Detection, Monitoring, and Mitigation," Navigation: Journal of the Institute of Navigation, vol. 67, 2020, pp. 511-535.

Sickle, J. V., "Two Types of Observables," GEOG 862: GPS and GNSS for Geospatial Professionals, 3 pages retrieved on Oct. 2, 2023 from https://www.e-education.psu.edu/geog862/node/1752.

Klobuchar, J. A., "Ionospheric Time-Delay Algorithm for Single-Frequency GPS Users," IEEE Transactions on Aerospace and Electronic Systems 3, 1987, pp. 325-331.

RTCM Special Committee. "RTCM standard 10403.3 differential GNSS (global navigation satellite systems) services-version 3." RTCM Special Committee 104 (2016).

Partial European Search Report for Application No. 23211487.6-1206, mailed May 31, 2024, 14 pages.

Murphy, T. et al., "Ionospheric Gradient Monitoring for Dual Frequency Multi-Constellation GBAS," ION ITM 2022, Proceedings of the 2022 International Technical Meeting of the Institute of Navigation, Jan. 25-27, 2022, pp. 1075-1097.

Extended European Search Report for Application No. 23211484.3-1206, mailed Sep. 2, 2024, 25 pages.

Extended European Search Report for Application No. 23211487.6-1206, mailed Sep. 24, 2024, 15 pages.

Liu, M., et al., "Design of Ionospheric TEC Gradient Anomaly Detection Platform Based on GNSS," 2022 International Symposium on Aerospace Engineering and Systems (ISAES 2022) IOP Publishing, Journal of Physics: Conference Series, 7 pages.

Koroglu, M., et al., "Analysis of Seasonal Ionospheric Gradients Over Turkey For Year 2011," $32^{nd}$ URSI GASS, Montreal, Aug. 19-26, 2017, 4 pages.

Budtho, J., et al., "The Improvement of Time-step method for Ionospheric Delay gradient Estimation," 2019 $34^{th}$ International Technical Conference on Circuits/Systems, Computers and Communications (ITC-CSCC), IEEE, Jun. 23, 2019, 4 pages.

Aquino, M., et al., "Improving the GNSS positioning stochastic model in the presence of ionospheric scintillation," Journal of Geodesy, Continuation of Bulletin Geodesique and Manuscripta Geodaetica, Springer, Berlin, DE; vol. 83, No. 19, Mar. 24, 2009, pp. 953-966.

Park, J., et al., "Mitigation of Ionospheric Effects on GNSS Positioning at Low Latitudes," Navigation: Journal of The Institute of Navigation, vol. 64, No. 1, Spring 2017, pp. 67-64.

Susi, M., et al., "Design of a robust receiver architecture for scintillation monitoring," 2014 IEEE/ION Position, Location and Navigation Symposium—Plans 2014, May 5, 2014, pp. 73-81.

Veettil, S.V., et al., "Mitigation of ionospheric scintillation effects on GNSS precise point positioning (PPP) at low latitudes," Journal of Geodesy, Springer Berlin Heidelberg, Berlin/Heidelberg; vol. 94, No. 2, Jan. 14, 2020, 10 pages.

* cited by examiner

IONOSPHERIC DISTURBANCE INFORMATION GENERATION METHODS AND SYSTEMS

FIELD OF TECHNOLOGY

The invention relates to methods, systems, devices, and computer programs for providing and using information related to the ionosphere in the context of (e.g., positioning) methods and systems making use of navigation satellite systems (NSS) signals. The fields of application of the methods, systems, devices, and computer programs include, but are not limited to, geospatial positioning, navigation, highly automated driving, autonomous driving, map making, land surveying, civil engineering, construction, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BDS (China), QZSS (Japan), and the Indian Regional Navigational Satellite System (IRNSS, also referred to as NAVIC) (systems in use or in development). An NSS typically uses a plurality of satellites orbiting the Earth. The plurality of satellites forms a constellation of satellites. An NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS, and Galileo is provided for example in sections 9, 10, and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors, and multipath propagation.

The carrier signals transmitted by the NSS satellites can also be tracked to provide an alternative, or complementary means of determining the range, or change in range between the receiver and satellite. Carrier phase measurements from multiple NSS satellites facilitate estimation of the position of the NSS receiver.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, has an effective chip length that is much longer than one cycle of the carrier on which the code is modulated. Code and carrier phase measurements have precisions that are roughly the same fraction of the respective chip length or wavelength. The position resolution may therefore be viewed as greater for carrier phase detection than for code detection.

However, in the process of estimating the position based on carrier phase measurements, the carrier phases are ambiguous by an unknown number of cycles. The fractional phase of a received signal can be determined but the additional number of cycles required to determine the satellite's range cannot be directly determined in an unambiguous manner. This is the so-called "integer ambiguity problem", "integer ambiguity resolution problem", or "phase ambiguity resolution problem", which may be solved to yield the so-called fixed-ambiguity solution (sometimes referred to simply as the fixed solution).

GNSS observation equations for code observations and for carrier phase observations are for instance provided in reference [1], section 5. An introduction to the GNSS integer ambiguity resolution problem, and its conventional solutions, is provided in reference [1], section 7.2. The person skilled in the art will recognize that the same or similar principles apply to RNSS.

The main GNSS observables are therefore the carrier phase and code (pseudorange), the former being generally much more precise than the latter, but ambiguous. These observables enable a user to obtain the geometric distance from the receiver to the satellite. With known satellite position and satellite clock error, the receiver position and receiver clock error can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequencies is modulated with a pseudo-random noise (PRN) code, and optionally with satellite navigation data. When GNSS satellites broadcast signals that do not contain navigation data, these signals are sometimes termed "pilot" signals, or "data-free" signals. In relation to GPS, two different PRN codes are transmitted by each satellite: a C/A code and a P code which is encrypted for DoD-authorized users to become a Y code. Each C/A code is a unique sequence of 1023 bits, which is repeated each millisecond. Other NSS systems also have satellites transmitting multiple signals on multiple carrier frequencies.

In order to reduce the convergence time of a positioning solution, it is known from ref. [2], p. 4, lines 26-30, to provide, to NSS receivers and/or to servers in charge of processing observations from NSS receiver(s), regionally-applicable correction information (i.e., regional correction information) representing regional ionosphere correction models per satellite. This may for example be used in precise point positioning (PPP) applications. The regional correction information may comprise information for correcting observations useful for estimating phase ambiguities and/or a position of the NSS receiver(s) (ibid., p. 5, lines 41-42), and, in particular, it may represent, per NSS satellite, the ionospheric delay in the region of interest (ibid., p. 6, lines 30-34). The ionospheric delay (also called ionosphere delay)

represents the estimated delay affecting the code observations, whereas the carrier phase observations are advanced by the same amount (ibid., p. 10, lines 25-47).

There is a constant need for improving the implementation of positioning or similar systems making use of NSS observables, in particular considering the effects the physical properties of the Earth's atmosphere may have on electromagnetic waves and therefore on NSS signals.

SUMMARY

The present invention aims at addressing the above-mentioned need. The invention includes methods, systems, computer programs, computer program products, and storage mediums as defined in the independent claims. Particular embodiments are defined in the dependent claims.

In a first embodiment, a method aims at providing ionospheric disturbance information applicable to a region of the Earth and suitable for use by a NSS receiver and/or a processing entity capable of receiving data from the NSS receiver in contributing to computing a positioning solution based on NSS signals received by the NSS receiver from a plurality of NSS satellites, hereinafter referred to as "first set of NSS satellites". The method comprises the following steps and/or operations. For a point, hereinafter referred to as "station", on or near the surface of the Earth, ionospheric disturbance information, hereinafter referred to as "station-specific ionospheric disturbance information", is generated. The station-specific ionospheric disturbance information comprises ionospheric scintillation information and/or ionospheric gradient information. Generating the station-specific ionospheric disturbance information comprises: (i) computing, for each of a plurality of NSS satellites, hereinafter referred to as "second set of NSS satellites", an ionospheric disturbance level, hereinafter referred to as "satellite-specific ionospheric disturbance level", the second set of NSS satellites being different from the first set of NSS satellites, partially different from the first set of NSS satellites, or the same as the first set of NSS satellites, and (ii) computing a measure of the satellite-specific ionospheric disturbance levels over the second set of NSS satellites, the measure being hereinafter referred to as "ionospheric-disturbance-levels-summarizing measure". The station-specific ionospheric disturbance information, being or comprising the ionospheric-disturbance-levels-summarizing measure, is then provided, e.g. for positioning purposes on the NSS receiver side.

The method of the first embodiment aims at allowing the generation and provision (e.g., by broadcasting) of specific ionospheric disturbance information that NSS receivers (and/or processing entities capable of receiving data from NSS receivers) may use to mitigate the effect of ionospheric disturbances on, for example, a positioning solution. This is particularly useful because ionospheric scintillation and other ionospheric disturbances can severely degrade the quality of NSS signals received by a NSS receiver and thus, for example, positioning performance.

In a second embodiment, a method is carried out by a NSS receiver and/or a processing entity capable of receiving data from the NSS receiver, for estimating parameters useful to, i.e. suitable to, determine a position. The NSS receiver observes NSS signals from a plurality of NSS satellites. The method comprises the following steps and/or operations. At least one estimation process is operated, each estimation process being hereinafter referred to as "NSS estimator" and the at least one NSS estimator being hereinafter referred to as "NSS estimator set", wherein each NSS estimator uses state variables and computes values of its state variables based on NSS signals observed by the NSS receiver and/or information derived from the NSS signals. Ionospheric disturbance information is obtained, which comprises ionospheric scintillation information and/or ionospheric gradient information (the ionospheric disturbance information may, but is not limited to, be as described in relation to the first embodiment). It is determined that the ionospheric disturbance information indicates an ionospheric disturbance level exceeding a threshold, and, then, for at least one NSS estimator of the NSS estimator set, at least one of a first operation and a second operation is performed. The first operation comprises: (a) adapting an ionospheric noise model of the NSS estimator based on the ionospheric disturbance information or (b) switching the NSS estimator to ionospheric free observations. The second operation comprises: adapting an observation noise model of the NSS estimator based on the ionospheric disturbance information. In this second embodiment, the ionospheric disturbance information may comprise station-specific and/or satellite-specific ionospheric disturbance information.

The method of the second embodiment aims at allowing the use of ionospheric disturbance information by NSS receivers (or processing entities capable of receiving data from NSS receivers) to mitigate the effect of ionospheric disturbances on, for example, a positioning solution.

In one embodiment, a system is configured for carrying out the above-described method of the first embodiment.

In one embodiment, a system comprises an NSS receiver and/or a processing entity capable of receiving data from the NSS receiver, the system being for estimating parameters useful to, i.e. suitable to, determine a position, the NSS receiver being configured for observing NSS signals from a plurality of NSS satellites, and the system being configured for carrying out the above-described method of the second embodiment. A vehicle may comprise such a system.

In some embodiments, computer programs, computer program products and storage media for storing such computer programs are provided. Such computer programs comprise computer-executable instructions configured for carrying out, when executed on a computer such as for example one embedded in, or otherwise part of, a NSS receiver or in another apparatus, or when executed on a set of computers such as a set of computers embedded in, or otherwise part of, a set of apparatuses, the above-described methods.

BRIEF DESCRIPTION OF THE DRAWINGS

Embodiments of the present invention shall now be described in conjunction with the appended drawings in which.

DETAILED DESCRIPTION

The present invention shall now be described in conjunction with specific embodiments. These serve to provide the skilled person with a better understanding but are not intended to in any way restrict the scope of the invention, which is defined by the appended claims. In particular, the embodiments described throughout the description can be combined to form further embodiments to the extent that they are not mutually exclusive.

Throughout the following description, the abbreviation "GNSS" is sometimes used. The invention is, however, not limited to global navigation satellite systems (GNSS) but also applies to regional navigation satellite systems (RNSS). Thus, it is to be understood that each occurrence of "GNSS" in the following can be replaced with "RNSS" to form additional embodiments.

In the art, the term "observables" is often used to refer to structures of an NSS signal from which observations or measurements can be made (PRN-code, carrier phase) (see e.g. ref. [3]: "The word observable is used throughout GPS literature to indicate the signals whose measurement yields the range or distance between the satellite and the receiver."). However, in common usage, and in the present document, the term "observable" (also referred to as "NSS observable") is also interchangeably used to refer to the observation itself, such that, for example, "carrier phase observable" has the same meaning as "carrier phase observation". Further, when the present document describes that an NSS signal is observed, this means that at least an observation (measurement) of at least an observable of the NSS signal is made. By extension, in the present document, terms such as "delta carrier phase observables" (also referred to as "time-differenced carrier phase observables") are also sometimes used although delta carrier phase observables are strictly speaking not directly observed but constructed, i.e. formed by computation, based on observables.

When the term "real-time" is used in the present document, it means that there is an action (e.g., data is processed, results are computed) as soon as the required information for that action is available. Thus, certain latency exists, which depends on various aspects depending on the involved component(s) of the system.

When the verb "broadcast" (and "broadcasting", etc.) is used, this also covers embodiments where the transmission is a form of multicasting.

Figure 1:
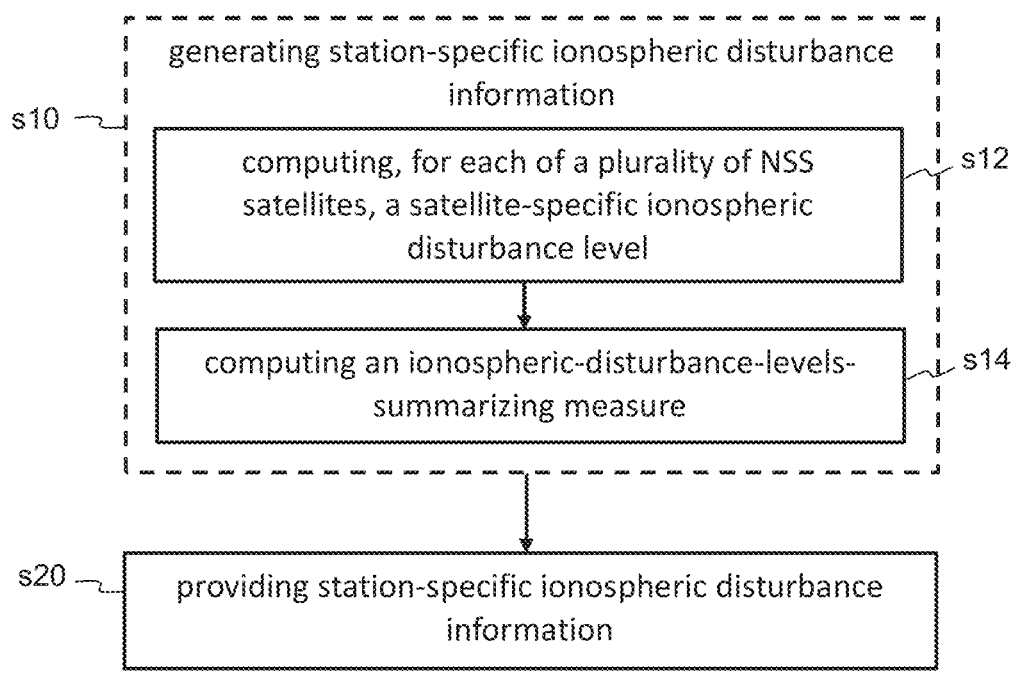
FIG. 1 is a flowchart of a method in one embodiment of the invention.

FIG. 1 is a flowchart of a method in one embodiment of the invention, for generating and providing ionospheric disturbance information applicable to a region of the Earth. The ionospheric disturbance information is suitable for use by a NSS receiver and/or a processing entity capable of receiving data from the NSS receiver, in contributing to computing a positioning solution based on NSS signals received by (i.e., observed by) the NSS receiver from a plurality of NSS satellites, here referred to as "first set of NSS satellites", over multiple epochs. The method illustrated in FIG. 1 may be carried out by one or more computers and/or servers, or more generally by any number of processing entities implemented in hardware, firmware, and/or software. In one embodiment, the method is carried out in the cloud, i.e. by any number of processing entities in the cloud. In one embodiment, part of the method illustrated in FIG. 1 may be carried out by a NSS receiver and/or a processing entity capable of receiving data from the NSS receiver, as will be described further below.

Ionospheric disturbance information means here information that at least represents transient irregularities or disturbances (also called "perturbations" or "anomalies") in the ionosphere and/or an amount or level (also referred to as "severity") of such irregularities or disturbances in the ionosphere at a given point in time (or during a given period). These irregularities or disturbances are susceptible to affect electromagnetic signals—in the radio waves spectrum—passing through the ionosphere for specific frequencies, beyond the usual ionospheric effects on code and phase observations in a region of interest (these usual effects are described for example in ref. [2], p. 10, lines 21-47; as mentioned above). These transient irregularities or disturbances encompass, but are not necessarily limited to, ionospheric scintillation and travelling ionospheric disturbances (TID), and the ionospheric disturbance information may represent a level of ionospheric scintillation, the level of TID, a level of a certain type of ionospheric scintillation or TID, or an aggregated level of both scintillation and TID. These transient irregularities or disturbances correspond to dynamic changes in time and/or space in the properties of the ionosphere, whereas the above-referred usual ionospheric effects affecting code and phase observations are related to the static properties of the ionosphere.

Ionospheric scintillations are rapid fluctuations in the amplitude and phase of radio signals due to small scale irregularities in the ionosphere. They can lead to complete loss of signal tracking or loss of carrier phase lock (cycle slips). Ionospheric scintillation is a strong function of local time, season, geomagnetic activity and the solar cycle. Typically, it is a post-sunset phenomenon occurring between 7 PM and 1 AM local time in equatorial regions. It can, however, occur at any time in polar regions. In some embodiments, amplitude scintillations are rapid fluctuations in amplitude of radio signals in that the scintillations may for example be characterized by an order of magnitude of 10 dBHz/s rates of change as measured in carrier-to-noise-density ratio (C/No) rates of change. In some embodiments, phase scintillations are rapid fluctuations in phase of radio signals in that the scintillations may for example be characterized by an order of magnitude of a couple of L1 cycles/s (0.38 m/s) as measured in the GPS L1 ionospheric delay rate of change.

Figure 8:
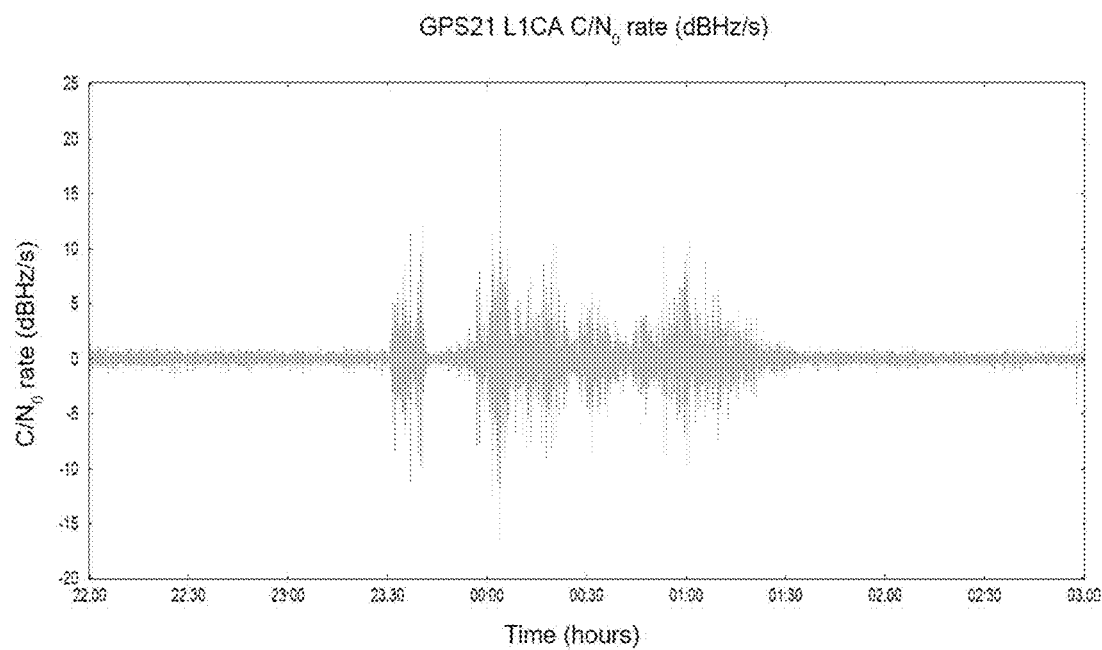
FIG. 8 illustrates an amplitude scintillation example for the L1CA signal of GPS21 satellite.
Figure 9:
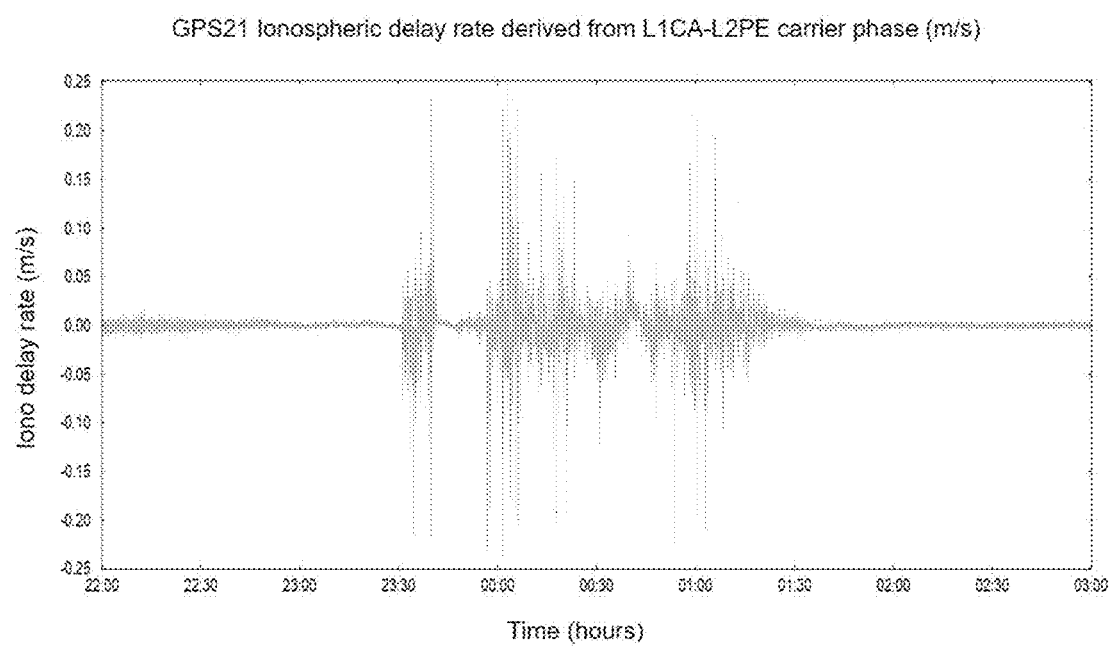
FIG. 9 illustrates a phase scintillation example for GPS21 satellite based on L1CA-L2PE signals.

FIG. 8 illustrates an amplitude scintillation example for the L1CA signal of GPS21 satellite, observed over Rio Verde, Brazil. Specifically, FIG. 8 shows the carrier-to-noise-density ratio (C/No) rate of change (dBHz/s) over time, from 2016 Oct. 14 22:00 to 2016 Oct. 15 03:00 UTC, which corresponds to 7 PM to 12 PM BRT. FIG. 9 illustrates a phase scintillation example for GPS21 satellite based on L1 C/A-L2 PE signals, also observed over Rio Verde, Brazil. Specifically, FIG. 9 shows, over time (also from 2016 Oct. 14 22:00 to 2016 Oct. 15 03:00 UTC, i.e. from 7 PM to 12 PM BRT), the ionospheric delay rate of change (m/s) computed from the L1CA and L2PE carrier phase observations (regarding how the ionospheric delay rate of change may be computed, see also Equation 5 below). The GPS L1CA signal (also referred to as "L1 C/A" signal) is the GPS coarse/acquisition (C/A) code signal transmitted on the GPS L1 frequency band (1575.42 MHZ). For older GPS satellites, which do not transmit the modernized GPS L2 C code signal on the GPS L2 frequency band (1227.6 MHz), a codeless or semi-codeless technique may be used to track the encrypted GPS P code signal (see refs. [22] and [23]), here referred to as GPS L2PE (also referred to as "L2 PE").

The maximum intensity and frequency of ionospheric scintillation generally occurs at the peak of the 11-year solar cycle and in two bands surrounding the magnetic equator. Its frequency also tends to increase around the equinoxes (i.e., March and September). At the time of writing, the next solar maximum is predicted to occur in July 2025.

It has been observed that, over Brazil, in an equatorial region, ionospheric scintillation typically impacts a subset of the NSS satellites, it is characterized by a high ionosphere rate of change, and it causes significant C/No fades and a significant number of cycle slips. It has been further observed that, over Canada, in a polar region, ionospheric scintillation typically impacts most (if not all) satellites simultaneously, it is characterized by a very high ionosphere rate of change, and it causes no significant C/No fading and relatively few cycle slips.

More information about the physical phenomenon of ionospheric scintillation can be found for example in refs. [4] to [8]. Ref. [4] relates to monitoring ionospheric irregularities on a global scale using the GPS network. Ref. [5] relates to deriving a total electron content (TEC) rate using GNSS carrier phase measurements to characterize dynamic changes of the ionosphere (i.e., ionospheric disturbance) in a low-latitude region, i.e. the Hong Kong region. It distinguishes between ionosphere quiet periods and ionosphere disturbance periods, also called "ionosphere active periods" (with an identified TEC rate being three times of TEC rate in ionosphere quiet periods). Ref. [6] relates to observing ionospheric irregularities at high latitudes using GPS measurements, and generation of maps of ionospheric irregularities (maps of the ionospheric fluctuation activity). Its introduction notably discusses the causes of ionospheric scintillation, how it can be characterized, and which indicators can be used to characterize it. Ref. [7] discusses the causes and nature of ionospheric scintillation and focuses on how scintillation can be measured, i.e. detected (sensed), with GNSS receivers. Ref. [8] relates to the derivation of a GNSS receiver-based amplitude scintillation index. In its introduction (see especially first and second paragraphs), ref. [8] divides the ionospheric effect on GNSS signals into a component having a benign effect, the usual ionospheric delay (see above discussion of ref. [2]), and a component causing disturbance, known as ionospheric scintillation, which in turn "can be classified into amplitude scintillation and phase scintillation".

Travelling ionospheric disturbances (TID) are short-term deviations from regular ionospheric climatology. Large-scale TIDs typically have periods between 30 minutes and 5 hours whereas medium-scale TIDs typically have periods between 10 to 30 minutes and small-scale TIDs typically have periods smaller or equal to 10 minutes. TIDs may develop from various sources such as geomagnetic storms, solar flares, eclipses, sunset, sunrise, hurricanes, tornadoes, volcanos, earthquakes, and rocket launches. They can be local, regional and sometimes global, and they can occur at any latitude and at any time. TIDs induce irregular variations in the total electron content (TEC) leading to higher-than-expected ionospheric delay gradients (also called "ionospheric spatial gradients", "ionospheric spatial decorrelation", or simply "ionospheric gradients"), i.e. higher-than-expected (i.e., anomalous) spatial variations of the ionosphere delay. As an example, ref. [9], FIG. 1, third column, shows the effect of medium-scale TIDs on differenced ionospheric biases in the south-north ($\Delta I_{LAT}$) and west-east ($\Delta I_{LON}$) directions in the mid-latitude region of Central Europe. The term "higher-than-expected" means, in one embodiment, two or more orders of magnitude larger than during quiet periods. As an example, ref. [20] explains that, during one geomagnetic storm (large-scale TIDs), the authors observed a maximum increase in the ionospheric gradients almost three orders of magnitude greater than during quiet periods (specifically 980 mm/km vs 1 mm/km or 980 ppm vs 1 ppm). See also ref. [21] regarding the magnitude of ionospheric gradients observed during geomagnetic storms.

More information about the physical phenomena causing TIDs and ionospheric spatial gradients can be found for example in refs. [10] to [14]. Ref. [10] explains that an ionospheric spatial decorrelation is usually quantified using a spatial gradient parameter, which is an ionosphere TEC difference per unit distance of ionospheric pierce point (IPP), and ref. [10] "focuses on the relationship between the ionospheric spatial decorrelation and space weather indices". Ref. [11] notably shows, in its FIG. 1, a "worst-case" ionospheric spatial gradient "modeled as a wave front of a certain magnitude ( . . . ) moving with constant speed and direction", and it focuses on detecting ionospheric gradients in real-time. Ref. [12] studies ionospheric spatial gradients in Brazil and notably uses a time-step method to estimate the standard deviation of vertical ionospheric gradients ($\sigma_{vig}$). That method "groups a single satellite and a single receiver as a pair and obtains the spatial separation of interest by adjusting the time window of observation" (ref. [12], p. 392, right-hand col.). Ref. [13] also relates to using time-step gradients to detect ionospheric spatial decorrelations for Ground-Based Augmentation Systems (GBAS) at low latitudes, and it explains that ionospheric spatial decorrelations can be caused by plasma bubbles in the ionosphere. Ref. [14] relates to estimating ionospheric delay gradients in Indonesia for use in GBAS.

The term "providing" in "providing ionospheric disturbance information" (or the like) means here (i) sending, for example from a reference station (also called "base receiver") or reference station system, the ionospheric disturbance information, i.e. transmitting, broadcasting or otherwise making the ionospheric disturbance information available, to one or more NSS receivers and/or one or more processing entities capable of receiving data from one or some of the NSS receiver(s), or (ii) providing, internally within a NSS receiver or NSS receiver system, the ionospheric disturbance information after generating it on the NSS receiver or NSS receiver system based on data from a reference station or reference station system.

The region of the Earth to which the ionospheric disturbance information is applicable is a portion of the Earth's surface over which the ionospheric disturbance information is considered to be relevant.

Returning now to FIG. 1, in step s10, ionospheric disturbance information, here referred to as "station-specific ionospheric disturbance information", is generated for a point, here referred to as "station", on or near the surface of the Earth. The station may for example be an antenna phase center (APC) of a reference station (the position of which being precisely known), which may or may not belong to a network of reference stations, with each reference station comprising, or being communicably attached to, a NSS reference receiver (also called "base receiver"). The station-specific ionospheric disturbance information comprises ionospheric scintillation information and/or ionospheric gradient information. Ionospheric scintillation information may comprise information that at least represents estimated ionospheric scintillation properties or an estimated amount or level (also referred to as "severity") of ionospheric scintillation in the ionosphere at a given point in time or during a given period. Ionospheric gradient information may comprise information that at least represents estimated spatial variations of the ionosphere delay or an estimated amount or level (also referred to as "severity") of spatial variations in the ionosphere at a given point in time or during a given period.

Generating s10 comprises computing s12, for each of a plurality of NSS satellites, here referred to as "second set of NSS satellites", an ionospheric disturbance level, here referred to as "satellite-specific ionospheric disturbance level", and then computing s14 a measure of the satellite-specific ionospheric disturbance levels over the second set of NSS satellites, the measure being here referred to as "ionospheric-disturbance-levels-summarizing measure". The second set of NSS satellites may be different from the first set of NSS satellites, partially different from the first set of NSS satellites, or the same as the first set of NSS satellites.

A satellite-specific ionospheric disturbance level represents an estimated level of ionospheric disturbance affecting a link between the station under consideration (i.e., the station for which the station-specific ionospheric disturbance information is generated s10) and the satellite under consideration (i.e., the satellite for which the satellite-specific ionospheric disturbance level is computed s12) at a given point in time or during a given period. The satellite-specific ionospheric disturbance level may be provided specifically for a frequency or a frequency band. In one embodiment, the link between the station under consideration and the satellite under consideration follows or substantially follows the line of sight between the two.

An ionospheric-disturbance-levels-summarizing measure is a measure that is specific to a station and serves to summarize the satellite-specific ionospheric disturbance levels associated with the station.

In one embodiment, the ionospheric-disturbance-levels-summarizing measure is or comprises at least one of: (i) a mean of the satellite-specific ionospheric disturbance levels over the second set of NSS satellites; (ii) a weighted mean of the satellite-specific ionospheric disturbance levels over the second set of NSS satellites; and (iii) a maximum of the satellite-specific ionospheric disturbance levels over the second set of NSS satellites. The invention is, however, not limited to the use of these summarizing measures. Other types of summarizing measures may be used instead. Regarding item (ii), the weight for (i.e., associated with) a given satellite may correspond, in some embodiments, to the expected accuracy of the ionospheric disturbance levels for that satellite. The amplitude and phase scintillation levels typically have expected accuracies that are functions of the line-of-sight elevation of the satellite. Similarly, the time-step ionospheric gradient typically has an expected accuracy that is a function of the line-of-sight elevation of the satellite but also the distance between ionospheric pierce points (IPP).

Figure 5A:
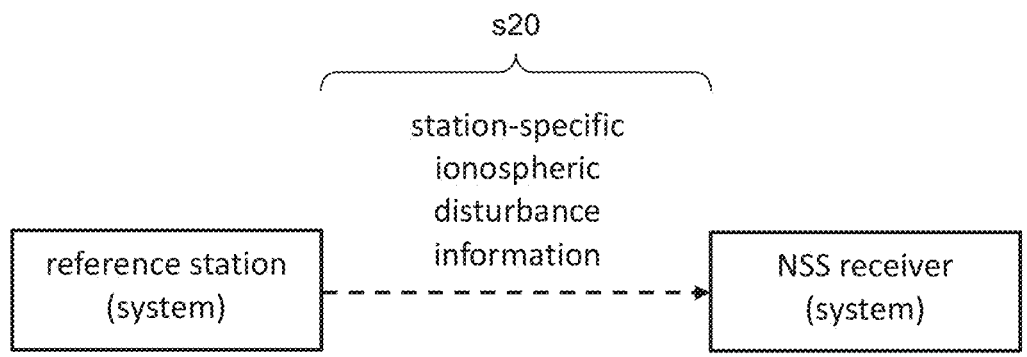
FIG. 5a schematically illustrates sending, from a reference station or reference station system to a NSS receiver or NSS receiver system, station-specific ionospheric disturbance information after generating it on the reference station or reference station system, in one embodiment of the invention.
Figure 5B:
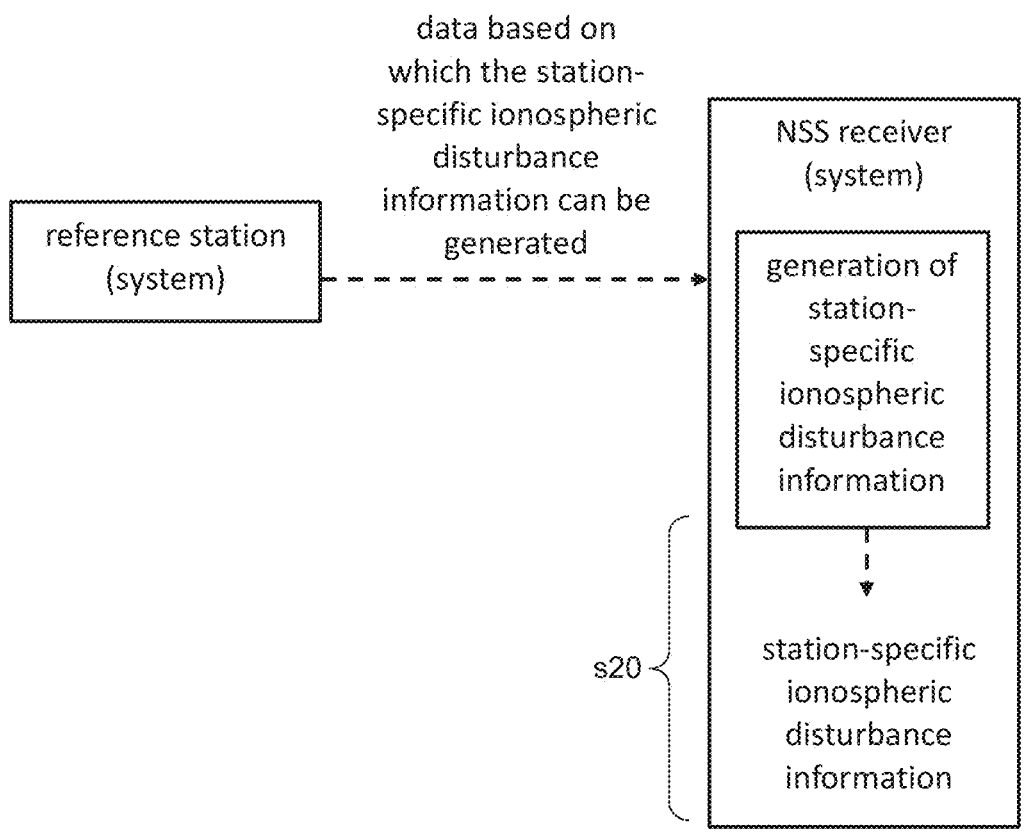
FIG. 5b schematically illustrates sending, from a reference station or reference station system to a NSS receiver or NSS receiver system, data based on which station-specific ionospheric disturbance information can be generated in a NSS receiver or NSS receiver system, in one embodiment of the invention.

In step s20, the station-specific ionospheric disturbance information, which is or comprises the ionospheric-disturbance-levels-summarizing measure, is then provided such as, as explained above, broadcast from a reference station or reference station system to a NSS receiver or NSS receiver system in the region to which the information is applicable (as schematically illustrated by FIG. 5a) or provided, internally within a NSS receiver or NSS receiver system (as schematically illustrated by FIG. 5b).

That is, for example, after computing s12 satellite-specific ionospheric disturbance levels, a reference station may broadcast that information, and a NSS receiver may be in charge of computing s14 the ionospheric-disturbance-levels-summarizing measure specific to the reference station.

As another example, a reference station may broadcast information based on which satellite-specific ionospheric disturbance levels may be computed, and then a NSS receiver may be in charge of both computing s12 satellite-specific ionospheric disturbance levels and computing s14 the ionospheric-disturbance-levels-summarizing measure specific to the reference station. In particular, the reference station's NSS observations—or information representing the reference station's NSS observations—may be transmitted to the NSS receiver. This is advantageous in terms of flexibility in that this can be done with reference stations (e.g., RTK base stations) that do not support detection and broadcast of ionospheric disturbance information, such as legacy or third-party RTK base station receivers.

The method illustrated in FIG. 1 therefore aims at allowing the generation and provision (e.g., by broadcasting) of station-specific ionospheric disturbance information that NSS receivers (and/or processing entities capable of receiving data from NSS receivers) may then use to mitigate the effect of ionospheric disturbances on, for example, a positioning solution. As mentioned above, this is particularly useful because ionospheric scintillation and other ionospheric disturbances can severely degrade the quality of NSS signals received by a NSS receiver and thus, for example, positioning performance. The provision of station-specific ionospheric disturbance information may enable an efficient transmission in terms of payload and thus also in terms of bandwidth required for transmission, while at the same time providing means for NSS receivers (and/or processing entities capable of receiving data from NSS receivers), when applicable, to reduce the time required to obtain fixed carrier phase ambiguities, increase the precision of estimates in fixed navigation solutions, avoid skewed fixed navigation solutions due to wrong ambiguity fixing, avoid situations in which no navigation solutions can be obtained due to the inability to maintain carrier phase lock, and, in general, increase the productivity of positioning processes on the NSS receiver side.

Transmitting data, such as station-specific ionospheric disturbance information, from a reference station of reference station system to NSS receivers (or to processing entities capable of receiving data from a NSS receiver) may for example be carried out in the form of data packets, such as IP packets, through, for example, any one of, or a combination of, the Internet, a cellular network, and a suitable satellite link. The skilled person would, however, appreciate that other forms of wired or wireless transmission may be involved, such as, and without being limited to, wireless transmissions based on Bluetooth, Wi-Fi, or Li-Fi. In one embodiment, data is transmitted in real-time, i.e. as soon as available (in line with the above-mentioned definition of the term "real-time"). In one embodiment, the data is transmitted as a data stream in that messages containing said data are transmitted at regular or irregular intervals through the same communication medium or channel. The data may be encoded and/or encrypted prior to transmission, and it may transit through any number of intermediate computers or other processing entities.

The station-specific ionospheric disturbance information or the information based on which the station-specific ionospheric disturbance information can be generated may be sent periodically or aperiodically. In one embodiment, the station-specific ionospheric disturbance information or the information based on which the station-specific ionospheric disturbance information can be generated is sent (e.g., broadcast) every u second(s), wherein u is a number selected within the range from 0.1 to 60, preferably a number selected within the range from 1 to 20.

In one embodiment, the station-specific ionospheric disturbance information or the information based on which the station-specific ionospheric disturbance information can be generated is transmitted together with correction information, for example as part of a correction stream (see e.g. refs. [2] and [15], and specifically for RTK correction formats, see e.g. refs. [18] and [19]). In one embodiment, the correction stream may be regionalized in that it applies to a region of the Earth's surface. The compactness of the station-specific ionospheric disturbance information lends itself well to broadcasting in a correction stream, which generally needs to be received as quickly as possible on the NSS receiver side.

In one embodiment, the station-specific ionospheric disturbance information or the information based on which the station-specific ionospheric disturbance information can be generated is transmitted over a one-way channel from the base station side to the NSS receiver side, i.e. not requiring a communication channel from the NSS receiver side to the base station side and therefore not requiring a transmitter at the NSS receiver. This differs from some virtual reference station (VRS) system requiring the rover (i.e., a form of NSS receiver) to communicate its approximate position to the network.

In one embodiment, both the station-specific ionospheric disturbance information and satellite ionospheric disturbance information are transmitted from a reference station of reference station system to NSS receivers (or to processing entities capable of receiving data from a NSS receiver). This is advantageous in terms of resolution of the station-specific ionospheric disturbance information, i.e. its resolution may be higher if the station-specific ionospheric information is computed on the reference station side compared to computing it on the NSS receiver side based on satellite-specific ionospheric disturbance information previously subject to quantization (for transmission as, for example, 3-bit values). For example, 3 bits may be used for transmitting an amplitude scintillation level per satellite, 3 bits for a phase scintillation level per satellite, 3 bits for a gradient level per satellite, 3 bits for an amplitude scintillation level per station, 3 bits for transmitting a phase scintillation level per station, and 3 bits for a gradient level per station.

Figure 2:
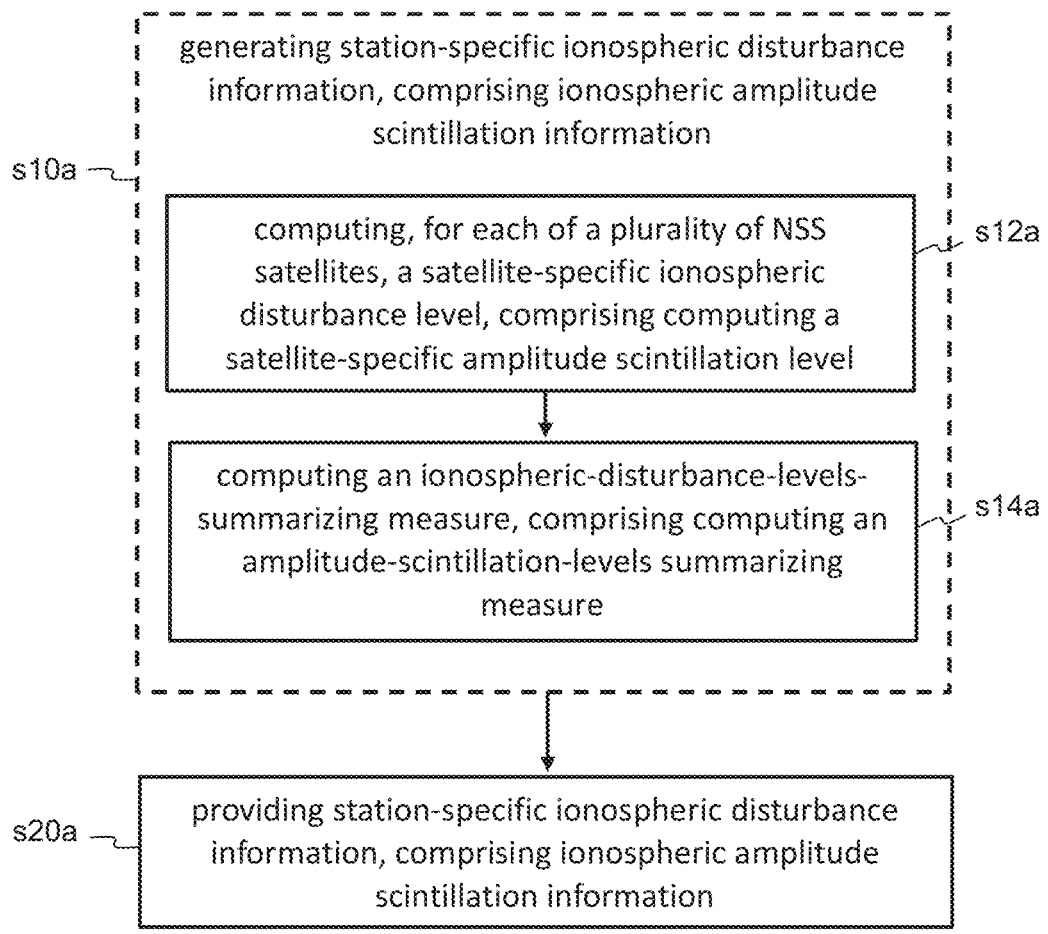
FIG. 2 is a flowchart of a method in one embodiment of the invention, involving the generation of station-specific ionospheric amplitude scintillation information.

FIG. 2 is a flowchart of a method in one embodiment of the invention, which differs from FIG. 1 in that the generated station-specific ionospheric disturbance information comprises ionospheric amplitude scintillation information.

Specifically, generating s10a the ionospheric amplitude scintillation information comprises computing s12a, for each of the satellites of the second set of NSS satellites, a satellite-specific amplitude scintillation level based on a channel carrier-to-noise-density ratio (C/No) rate of change associated with the satellite, for the purpose of ionospheric amplitude scintillation detection. Then, a measure of the satellite-specific amplitude scintillation levels over the second set of NSS satellites is computed s14a, the measure being here referred to as "amplitude-scintillation-levels summarizing measure". In step s20a, the station-specific ionospheric disturbance information, which is or comprises the amplitude-scintillation-levels summarizing measure, is then provided such as, as explained above, broadcast from a reference station or reference station system to NSS receivers or NSS receiver systems in the region to which the information is applicable (see FIG. 5a) or provided, internally within a NSS receiver or NSS receiver system (see FIG. 5b).

In one embodiment, the amplitude-scintillation-levels-summarizing measure is or comprises at least one of: a mean of the satellite-specific amplitude scintillation levels over the second set of NSS satellites; a weighted mean of the satellite-specific amplitude scintillation levels over the second set of NSS satellites; and a maximum of the satellite-specific amplitude scintillation levels over the second set of NSS satellites.

In one embodiment, NSS signals on more than one NSS frequency, here referred to as "NSS channel" (for example the GPS L1, L2, and L5 frequencies), are received from each of at least some of the satellites, here referred to as "multi-channel satellites", of the second set of NSS satellites and, for each multi-channel satellite, computing the channel carrier-to-noise-density ratio (C/No) rate of change comprises: computing a carrier-to-noise-density ratio rate of change for each NSS channel, and computing a mean carrier-to-noise-density ratio rate of change over all computed carrier-to-noise-density ratio rate of changes.

In one embodiment, the channel carrier-to-noise-density ratio (C/No) rate of change discussed with reference to FIG. 2 is a m Hz mean channel carrier-to-noise-density ratio rate of change, wherein m is a number selected within the range from 0.5 to 200, preferably a number selected within the range from 1 to 100, most preferably any one of 1, 2, 5, 10, 20, 50, and 100. In other words, a time series per satellite is monitored for amplitude scintillation detection.

Computing s12a, for a satellite, the satellite-specific amplitude scintillation level may, in one embodiment, comprise the following steps: (i) computing, for each channel received from the satellite, a carrier-to-noise-density rate of change from an epoch T-AT to an epoch T, where ΔT is equal to 1/m second (regarding the value m, see previous paragraph); (ii) computing the m Hz mean channel carrier-to-noise-density ratio rate of change by computing a mean of the carrier-to-noise-density rates of change over all channels; (iii) adding the m Hz mean channel carrier-to-noise-density ratio rate of change to a n-second moving window; and (iv) computing the root mean square (RMS) of all values in the n-second moving window to obtain the satellite-specific amplitude scintillation level. In that embodiment, n is a number selected within the range from 10 to 240, preferably a number selected within the range from 30 to 120. As an example, n may be equal to 60. Each satellite provides signals on L channels where L is, in one embodiment, in the range 1 to 6 depending on the receiver. If L equals 1, above-referred step (ii) can be skipped, i.e. the m Hz mean channel carrier-to-noise-density ratio rate of change may be equal to the carrier-to-noise-density ratio rate of change over the single channel.

Further, the satellite-specific amplitude scintillation level may, as part of step s12a, be filtered so that the level quickly moves up with increasing RMS and slowly fades with decreasing RMS. Such a filtering is beneficial in that rising amplitude scintillation levels can be quickly detected and acted upon. This in turn is beneficial to protect the integrity of the NSS estimator(s) (also sometimes called "navigation filter"). Regarding the NSS estimator(s), see also step s30 described below (with reference to FIGS. 6a to 6e).

Amplitude scintillation may for example be detected using the carrier-to-noise-density ratio, C/No, which is generally available with the code, carrier phase and Doppler measurements from each signal tracked by a GNSS receiver. As shown in FIG. 8, amplitude scintillation causes rapid changes in the otherwise stable C/No rate of change.

In one embodiment, the satellite-specific amplitude scintillation level is the RMS of values contained in a 60-second moving window consisting of the mean satellite channel $C/N_0$ rates of change computed at 1-second intervals. For example, (a) for each satellite channel, the $C/N_0$ rate of change is computed using the $C/N_0$ observations at times T−ΔT and T where ΔT=1 second; (b) the mean C/No rate of change (over all satellite channels received from the satellite under consideration) is computed from (a); (c) the mean C/No rate of change from (b) is added to the 60-second moving window; (d) the amplitude scintillation level is computed from the RMS of the values contained in the moving window; and (e) the amplitude scintillation level from (d) may be filtered so that it quickly adapts to rising amplitude scintillation levels and slowly fades for decreasing amplitude scintillation levels.

In one embodiment, to compute the amplitude scintillation level for one satellite (i.e., the above-referred satellite-specific amplitude scintillation level), the $C/N_0$ rates of change for all available signals from the satellite (i.e., for each satellite channel) are computed at 1-second intervals (i.e., using the $C/N_0$ observations at times T−ΔT and T where ΔT=1 second). The mean of these $C/N_0$ rates is computed and then added to a 60-second moving window, and the RMS of the $C/N_0$ rates in the moving window is used to determine the amplitude scintillation level for the satellite. Further, a filter is applied to the RMS values such that the amplitude scintillation level adapts quickly to increasing RMS values and fades slowly for decreasing RMS values, for example following:

$$\beta(t_n) = \beta(t_{n-1}) + (\text{RMS}(t_n) - \beta(t_{n-1})) \times K \quad \text{(Equation 1)}$$

where
$\beta(t_n)$ is the amplitude scintillation level at $t_n$ (dBHz/s)
$\beta(t_{n-1})$ is the amplitude scintillation level at $t_{n-1}$ (dBHz/s)
at $t_0$, $\beta(t_0)=\text{RMS}(t_0)$
$\text{RMS}(t_n)$ is the moving window RMS at $t_n$ (dBHz/s)
K is the filter gain=1.000 when $\text{RMS}(t_n) > \beta(t_{n-1})$
0.003 when $\text{RMS}(t_n) <= \beta(t_{n-1})$.

Figure 3:
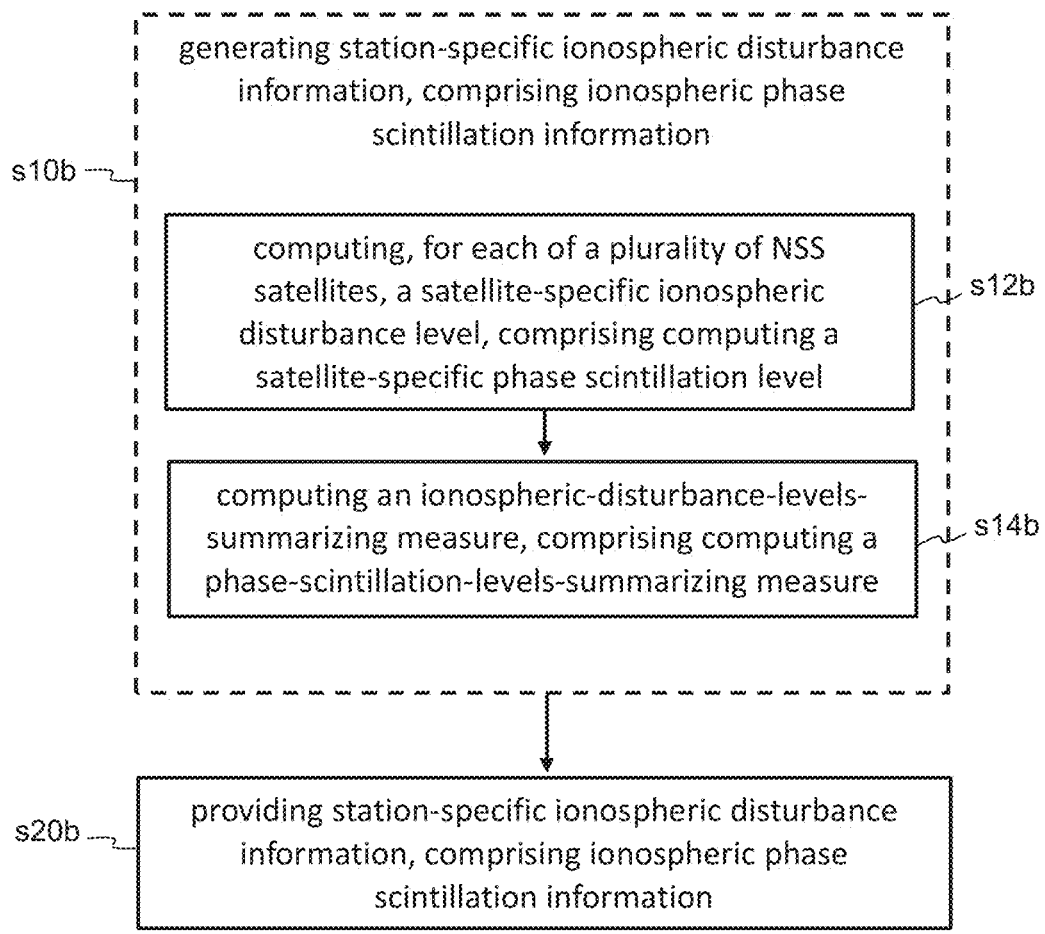
FIG. 3 is a flowchart of a method in one embodiment of the invention, involving the generation of station-specific ionospheric phase scintillation information.

FIG. 3 is a flowchart of a method in one embodiment of the invention, which differs from FIG. 1 in that the generated station-specific ionospheric disturbance information comprises ionospheric phase scintillation information.

Specifically, generating s10b the ionospheric phase scintillation information comprises computing s12b, for each of the satellites of the second set of NSS satellites, a satellite-specific phase scintillation level based on a channel pair ionospheric delay rate of change associated with the satellite, for ionospheric phase scintillation detection. Then, a measure of the satellite-specific phase scintillation levels over the second set of NSS satellites is computed s14b, the measure being here referred to as "phase-scintillation-levels-summarizing measure". In step s20b, the station-specific ionospheric disturbance information, which is or comprises the phase-scintillation-levels summarizing measure, is then provided such as, as explained above, broadcast from a reference station or reference station system to NSS receivers or NSS receiver systems in the region to which the information is applicable (see FIG. 5a) or provided, internally within a NSS receiver or NSS receiver system (see FIG. 5b).

In one embodiment, the phase-scintillation-levels-summarizing measure is or comprises at least one of: a mean of the satellite-specific phase scintillation levels over the second set of NSS satellites; a weighted mean of the satellite-specific phase scintillation levels over the second set of NSS satellites; and a maximum of the satellite-specific phase scintillation levels over the second set of NSS satellites.

In one embodiment, NSS signals on more than two NSS frequencies, here referred to as "NSS channel", are received from each of at least some of the satellites, these satellites being here referred to as "three-or-more-channel satellites", of the second set of NSS satellites and, for the three-or-more-channel satellites, computing the channel pair ionospheric delay rate of change comprises: computing an ionospheric delay rate of change for each possible pair of NSS channels; and computing a mean ionospheric delay rate of change over all computed ionospheric delay rate of changes.

In other words, if there are only two channels for a satellite, only one ionospheric delay rate of change is used for the satellite. If there are more than two channels, a mean of all possible channel pairs may be computed. For example, if a receiver is tracking L1, L2 and L5 signals from a GPS satellite, a mean ionospheric delay rate may be computed using the following three pairs: L1-L2, L1-L5, and L2-L5.

In one embodiment, the channel pair ionospheric delay rate of change discussed with reference to FIG. 3 is a p Hz mean channel pair ionospheric delay rate of change, wherein p is a number selected within the range from 0.5 to 200, preferably a number selected within the range from 1 to 100, most preferably any one of 1, 2, 5, 10, 20, 50, and 100. In other words, a time series per satellite is monitored for phase scintillation detection.

Computing s12b, for a satellite, the satellite-specific phase scintillation level may, in one embodiment, comprise: (i) computing, for each pair of channels received from the satellite, an ionospheric delay rate of change using carrier phase observations from the signals from the pair of channels from an epoch T-ΔT to an epoch T, where ΔT is equal to 1/p second (regarding the value p, see previous paragraph); (ii) computing the p Hz mean pair ionospheric delay rate of change by computing a mean of the ionospheric delay rate of changes over all pairs of channels; (iii) adding the p Hz mean channel carrier-to-noise-density ratio rate of change to a q-second moving window; and (iv) computing the RMS of all values in the q-second moving window to obtain the satellite-specific phase scintillation level. In that embodiment, q is a number selected within the range from 10 to 240, preferably a number selected within the range from 30 to 120. As an example, q may be equal to 60. Each satellite provides signals on L channels where L is, in one embodiment, in the range 2 to 6 depending on the receiver. If L equals 2, above-referred step (ii) can be skipped, i.e. the p Hz mean channel carrier-to-noise-density ratio rate of change may be equal to the ionospheric delay rate of change over the single pair of channels (e.g., GPS L1 and GPS L2).

Further, the satellite-specific phase scintillation level may, as part of step s12b, be filtered so that the level quickly moves up with increasing RMS and slowly fades with decreasing RMS. In a similar way to what was mentioned above in relation to the filtering of the amplitude scintillation level, such a phase scintillation filtering is beneficial in that rising phase scintillation levels can be quickly detected and acted upon. This in turn is beneficial to protect the integrity of the NSS estimator(s) (also sometimes called "navigation filter"). Regarding the NSS estimator(s), see also step s30 described below (with reference to FIGS. 6a to 6e).

Phase scintillation may for example be detected by monitoring the rate of change of the ionospheric delay computed using two carrier phase measurements to the same satellite. As shown in FIG. 9, phase scintillation causes rapid changes in the otherwise stable ionospheric delay rate of change.

In one embodiment, the satellite-specific phase scintillation level is the RMS of values contained in a 60-second moving window consisting of the mean ionospheric delay rate of change computed at 1-second intervals. For example, (a) for each possible satellite channel pair, the GPS L1 ionospheric delay rate of change is computed using the two-channel carrier phase observations at times T−ΔT and T where ΔT=1 second (the "GPS L1 ionospheric delay rate of change" means here the ionospheric delay rate of change computed from any two carrier phase measurements, i.e. the channel pair, for the GPS L1 frequency; see Equation 2 below, which may be used to do the conversion to have a common measure); (b) the mean GPS L1 ionospheric delay rate of change (over all pairs of channels received from the satellite under consideration) is computed from (a); (c) the mean GPS L1 ionospheric delay rate of change (b) is added to 60-second moving window; (d) the phase scintillation level is computed from the RMS of the values contained in the moving window; and (e) the phase scintillation level (d) may be filtered so that it quickly adapts to rising phase scintillation levels and slowly fades for decreasing phase scintillation levels.

In one embodiment, the slant ionospheric delay at a given point in time may be computed as follows:

$$I_s = \left(-(\phi_p - N_p) + (\phi_s - N_s) * F_p/F_s\right) \times \\ \left(F_p^2/F_{1GPS}^2\right) \times \left(F_s^2/(F_s^2 - F_p^2)\right) \times \lambda_p \quad \text{(Equation 2)}$$

where
$I_s$ is GPS $L_1$ slant ionospheric delay (meters)
$\phi_p$ is the primary band carrier phase measurement (cycles)
$\phi_s$ is the secondary band carrier phase measurement (cycles)
$N_p$ is the primary band carrier phase ambiguity (cycles)
$N_s$ is the secondary band carrier phase ambiguity (cycles)
$F_p$ is the primary band frequency (GHz)
$F_s$ is the secondary band frequency (GHz)
$F_{1GPS}$ is the GPS L1 band frequency (1575.42 GHZ)
$\lambda_p$ is the primary band wavelength (meters/cycle).

Separating the ambiguity terms in Equation 2 and lumping them into an ensemble bias gives:

$$I_s = \left(-\phi_p + \phi_s * F_p/F_s\right) \times \left(F_p^2/F_{1GPS}^2\right) \times \\ \left(F_s^2/(F_s^2 - F_p^2)\right) \times \lambda_p - N_b \quad \text{(Equation 3)}$$

where
$N_b$ is an ensemble bias (meters).

In the absence of cycle slips, the ensemble bias, $N_b$, is a constant.

The choice of primary and secondary band signals used to compute the ionospheric delay depends on the signals broadcast by each satellite and tracked by the receiver.

The slant ionospheric delay computed using Equation 3 is precise but ambiguous due to the ambiguity term, $N_b$. However, assuming there are no carrier phase cycle slips between the time step epochs $t_n$ and $t_{n+1}$, the ambiguity cancels when the delta ionospheric delay is computed:

$$\Delta I_s = I_s(t_n) - I_s(t_{n-1}) \quad \text{(Equation 4)}$$

where
$\Delta I_s$ is slant delta ionospheric delay (m)
$I_s(t_n)$ is GPS $L_1$ slant ionospheric delay at epoch $t_n$ (m)
$I_s(t_{n-1})$ is GPS $L_1$ slant ionospheric delay at epoch $t_{n-1}$ (m).

The slant delta ionospheric delay rate of change is then:

$$\Delta I_S^\Delta = (I_s(t_n) - I_s(t_{n-1}))/(t_n - t_{n-1}) \quad \text{(Equation 5)}$$

where $\Delta I_s^A$ is slant delta ionospheric delay rate of change (m/s)

$t_n$-$t_{n-1}$ is generally 1 second but other values may be used.

For each satellite, a mean delta (i.e., time-differenced) ionospheric delay rate of change is computed using multiple pairs of the available signals for the satellite. The mean of the delta ionospheric delay rates is added to a 60-second moving window and the RMS of the mean delta ionospheric delay rates in the moving window is used to determine the phase scintillation level for the satellite. A filter is applied to the RMS values such that the phase scintillation level adapts quickly to increasing RMS values and fades slowly for decreasing RMS values:

$$\Phi(t_n) = \Phi(t_{n-1}) + (RMS(t_n) - \Phi(t_{n-1})) \times K \qquad \text{(Equation 6)}$$

where $\Phi(t_n)$ is the phase scintillation level at $t_n$ (m/s)

$\Phi(t_{n-1})$ is the phase scintillation level at $t_{n-1}$ (m/s) at $t_0$ $\Phi(t_0)=RMS(t_0)$ $RMS(t_n)$ is the moving window RMS at $t_n$ (m/s)

K is the filter gain=1.000 when $RMS(t_n)>\Phi(t_{n-1})$ and 0.003 when $RMS(t_n)<=\Phi(t_{n-1})$.

Figure 4:
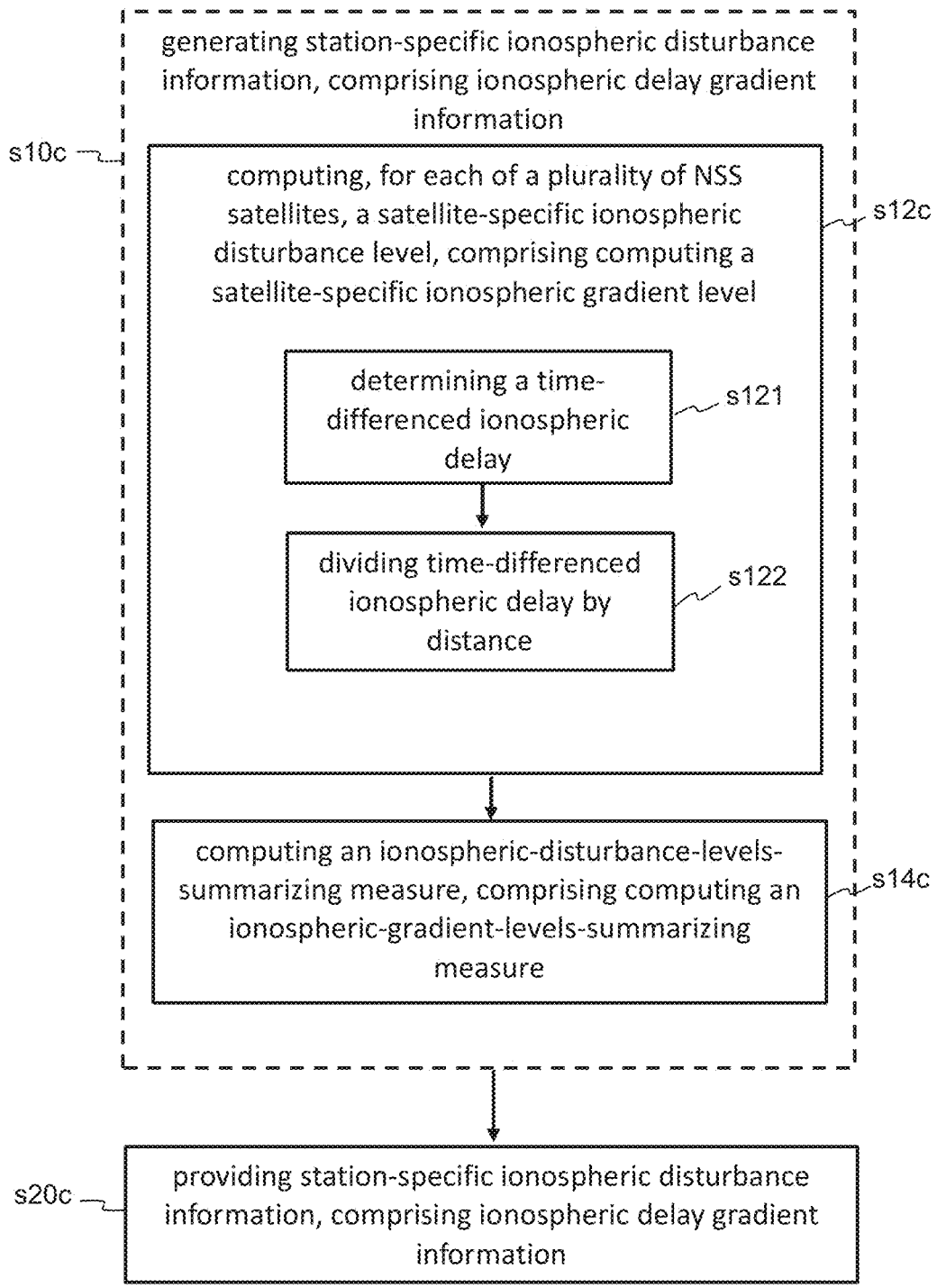
FIG. 4 is a flowchart of a method in one embodiment of the invention, involving the generation of station-specific ionospheric delay gradient information.

FIG. 4 is a flowchart of a method in one embodiment of the invention, which differs from FIG. 1 in that the generated station-specific ionospheric disturbance information comprises ionospheric delay gradient information.

Figure 10:
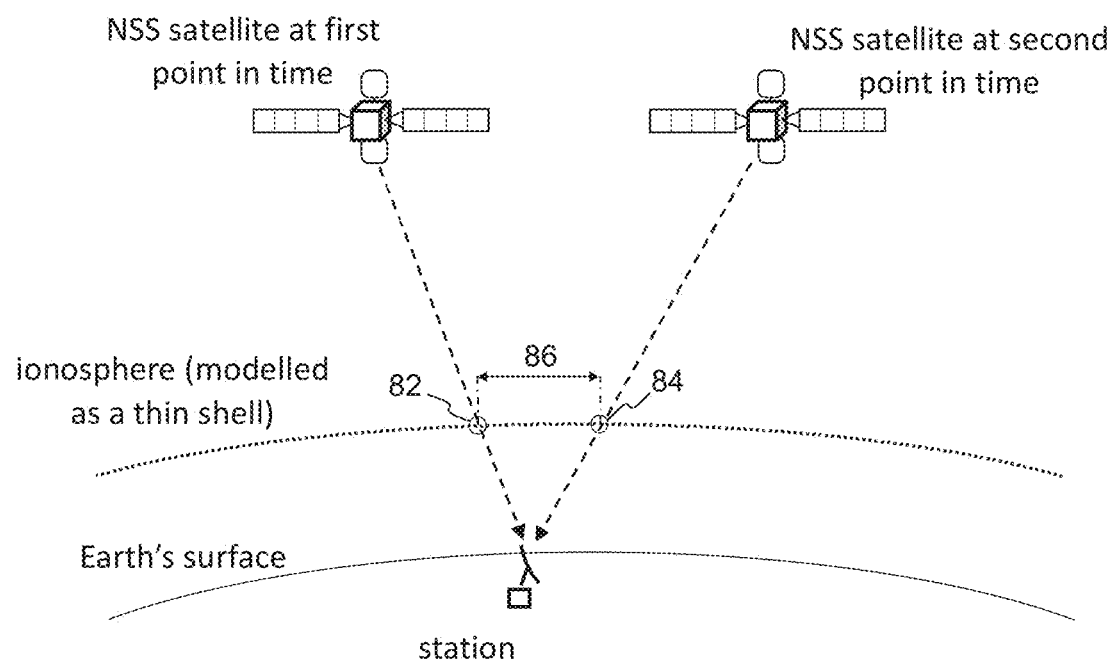
FIG. 10 schematically illustrates the computation of a time step spatial ionospheric gradient in one embodiment of the invention.

Specifically, generating s10c the ionospheric delay gradient information comprises computing s12c, for each of the satellites of the second set of NSS satellites, a satellite-specific ionospheric gradient level. The computation of the satellite-specific ionospheric gradient level comprises: determining s121 a difference, here referred to as "time-differenced ionospheric delay", between an ionospheric delay at a first point in time and an ionospheric delay at a second point in time (with the same satellite having moved in the meantime); and then dividing s122 the time-differenced ionospheric delay by a distance (ref. 86 in FIG. 10) between an ionospheric pierce point (IPP) (ref. 82 in FIG. 10) applicable at the first point in time and an IPP (ref. 84 in FIG. 10) applicable at the second point in time, as schematically illustrated in FIG. 10 (which is similar to ref. [12], FIG. 12, right-hand side "Time-step method"). For exemplary implementations of steps s121 and s122, see also equations 7 and 10 below. Then, a measure of the satellite-specific ionospheric gradient levels over the second set of NSS satellites is computed s14c, the measure being here referred to as "ionospheric-gradient-levels-summarizing measure".

In step s20c, the station-specific ionospheric disturbance information, which is or comprises the ionospheric-gradient-levels-summarizing measure, is then provided such as, as explained above, broadcast from a reference station or reference station system to NSS receivers or NSS receiver systems in the region to which the information is applicable (see FIG. 5a) or provided internally within a NSS receiver or NSS receiver system (see FIG. 5b).

In one embodiment, the ionospheric-gradient-levels-summarizing measure is or comprises at least one of: a mean of the satellite-specific ionospheric gradient levels over the second set of NSS satellites; a weighted mean of the satellite-specific ionospheric gradient levels over the second set of NSS satellites; and a maximum of the satellite-specific ionospheric gradient levels over the second set of NSS satellites.

In one embodiment, the first point in time and the second point in time are separated by r seconds, wherein r is a number selected within the range from 10 to 240, preferably a number selected within the range from 30 to 180, most preferably any one of 30, 60, 120, and 180. Over an exemplary 60-second interval (i.e., with r being equal to 60), the expected ionospheric gradient is 0.5 ppm during a quiet period, but it may be up to 30 ppm or more during an ionosphere active (i.e., disturbed) period.

The satellite-specific ionospheric gradient level may, as part of step s12c, be filtered so that the level quickly moves up with increasing gradient and slowly fades with decreasing gradient. In a similar way to what was mentioned above in relation to the filtering of the amplitude and phase scintillation levels, such an ionospheric gradient filtering is beneficial in that rising ionospheric gradient levels can be quickly detected and acted upon. This in turn is beneficial to protect the integrity of the NSS estimator(s) (also sometimes called "navigation filter"). Regarding the NSS estimator(s), see also step s30 described below (with reference to FIGS. 6a to 6e).

In one embodiment, the satellite-specific ionospheric gradient level is computed using the delta (i.e., time-differenced) ionospheric delay computed using one channel pair over a time interval of 60 seconds divided by the distance between the ionospheric pierce points. For example, (a) for a pre-selected satellite channel pair, the GPS L1 delta ionospheric delay is computed using the channel pair carrier phase observations at times T−ΔT and T where ΔT=60 seconds; (b) the ionospheric gradient level is computed by dividing the GPS L1 delta ionospheric delay (a) by the distance between the ionospheric pierce points (IPP) at T−ΔT and T; and (c) the ionospheric gradient level (b) may be filtered so that it quickly adapts to rising ionospheric gradient levels and slowly fades for decreasing ionospheric gradient levels.

In one embodiment, steps s121 and s122 may be implemented by computing a time-step spatial ionospheric gradient for a single satellite using GNSS carrier phase or code measurements from two frequency bands and the position of the ionospheric shell pierce points for the time step epochs. This may be performed for slant ionospheric gradients and/or vertical ionospheric gradients.

In one embodiment, to compute slant ionospheric gradients, Equation 3 is first used to compute the slant ionospheric delay using carrier phase measurements from the best available signal pair for the satellite. The slant delta ionospheric delay is then computed using Equation 4 but with the separation between $t_n$ and $t_{n-1}$ generally 30 seconds or larger.

To compute the distance between the ionospheric pierce points (IPP), it may be assumed that the ionospheric layer is a thin shell 450 km above the Earth's surface. Since the receiver and satellite positions are known with sufficient accuracy, the ionospheric shell pierce point positions at epochs $t_1$ and $t_2$ are easily computed and the slant ionospheric gradient can then be computed as:

$$G_s = \Delta I_s / |IPP(t_n) - IPP(t_{n-1})| \qquad \text{(Equation 7)}$$

where $G_s$ is the slant gradient (unitless)

$IPP(t_n)$ is the ionospheric shell pierce point position at epoch $t_n$

IPP($t_{n-1}$) is the ionospheric shell pierce point position at epoch $t_{n-1}$

|| is the vector norm operator.

The slant ionospheric gradient level is computed by filtering the slant ionospheric gradient observations, $G_s$, such that the gradient level adapts more quickly to increasing gradient values and fades more slowly to decreasing gradient values:

$$\psi_s(t_n) = \psi_s(t_{n-1}) + (G_s(t_n) - \psi_s(t_{n-1})) \times K \quad \text{(Equation 8)}$$

where $\psi_s(t_n)$ is the slant ionospheric gradient at $t_n$ (ppm)

$\psi_s(t_{n-1})$ is the slant ionospheric gradient at $t_{n-1}$ (ppm) at $t_0$ $\psi_s(t_0)=G_s(t_0)$ K is the filter gain=$(t_n-t_{n-1})/180$ when $G_s(t_n)>\psi_s(t_{n-1})$ and $(t_n-t_{n-1})/300$ when $G_s(t_n)<=\psi_s(t_{n-1})$.

Although slant ionospheric gradients are of interest, the vertical ionospheric gradients may also be useful. In one embodiment, a vertical ionospheric gradient is computed by mapping the slant ionospheric delay measurements, $I_s(t_n)$ and $I_s(t_{n-1})$, to the zenith at the pierce point positions, IPP($t_n$) and IPP($t_{n-1}$). The Klobuchar mapping function published in ref. [17] may for example be used for this purpose but other mapping functions can be used as well.

$$\Delta I_v = I_v(t_n) - I_v(t_{nn-1}) = \Omega(t_n) \times I_s(t_n) - \Omega(t_{n-1}) \times I_s(t_{n-1}) - \quad \text{(Equation 9)}$$
$$(\Omega(t_n) - \Omega(t_{n-1})) \times N_b$$

where $\Delta I_v$ is the vertical delta ionospheric delay (m)

$I_v(t_n)$ is the vertical ionospheric delay at epoch $t_n$ (m)

$I_v(t_{n-1})$ is the vertical ionospheric delay at epoch $t_{n-1}$ (m)

$\Omega(t_n)$ is the slant to zenith mapping factor at epoch $t_n$ $\Omega(t_{n-1})$ is the slant to zenith mapping factor at epoch $t_{n-1}$.

An issue that arises when computing vertical ionospheric gradients is that the mapping factors at $t_n$ and $t_{n-1}$ are not the same so that the ensemble bias, $N_b$, no longer cancels. The ensemble bias may be estimated but for the purpose of anomalous ionospheric gradient detection this may not be necessary. Instead, the initial ensemble bias may be computed using an ionospheric delay model such as, although not limited to, the Klobuchar model published in ref. [17]. Code measurements may also be used for this purpose.

The vertical ionospheric gradient is then:

$$G_v = \Delta I_v / |IPP(t_n) - IPP(t_{n-1})| \quad \text{(Equation 10)}$$

The vertical ionospheric gradient level may be computed by filtering the vertical ionospheric gradient observations, $G_s$, such that the gradient level adapts more quickly to increasing gradient values and fades more slowly to decreasing gradient values:

$$\psi_v(t_n) = \psi_v(t_{n-1}) + (G_v(t_n) - \psi_v(t_{n-1})) \times K \quad \text{(Equation 11)}$$

where $\psi_v(t_n)$ is the slant ionospheric gradient at $t_n$ (ppm)

$\psi_v(t_{n-1})$ is the slant ionospheric gradient at $t_{n-1}$ (ppm) at $t_0$ $\psi_v(t_0)=G_v(t_0)$ K is the filter gain=$(t_n-t_{n-1})/180$ when $G_v(t_n)>\psi_v(t_{n-1})$ and $(t_n-t_{n-1})/300$ when $G_v(t_n)<=\psi_v(t_{n-1})$.

In one embodiment, the station-specific ionospheric disturbance information serves as a summary of the satellite-specific ionospheric disturbance levels, and it may comprise one of, two of, or all of the following: (1) amplitude scintillation level which is any one of: the mean, weighted mean, or maximum of the satellite-specific filtered amplitude scintillation levels; (2) phase scintillation level which is any one of: the mean, weighted mean, or maximum of the satellite-specific filtered phase scintillation levels; and (3) ionospheric gradient level which is any one of: the mean, weighted mean or maximum of the satellite-specific filtered ionospheric gradient levels.

In one embodiment, the station-specific ionospheric disturbance information is broadcast in the form of a message, which is here referred to as "station-specific ionospheric disturbance message". For example, at a RTK base receiver (i.e., a form of reference station), Equations 1, 6 and 11 may be used to compute an amplitude scintillation level, $\beta(t_n)$, a phase scintillation level, $\Phi(t_n)$, and a vertical ionospheric spatial gradient level, $\psi_v(t_n)$, for each satellite at epoch $t_n$. An amplitude-scintillation-levels summarizing measure, a phase-scintillation-levels-summarizing measure, and an ionospheric-gradient-levels-summarizing measure are then computed over all the satellites, as described above. To reduce bandwidth, the summarizing levels may be encoded into 9 bits with bits 0-2 reserved for the amplitude scintillation level, bits 3-5 reserved for the phase scintillation level, and bits 6-8 reserved for the vertical ionospheric spatial gradient level. The meanings of the 3-bit values are given in Tables 1-3, purely as examples of possible encoding.

TABLE 1

Amplitude scintillation level encoding.

| Bits | Decimal | Amplitude level (dBHz/s) |
|---|---|---|
| XXXXXX000 | 0 | Not available |
| XXXXXX001 | 1 | 0.00 <= x < 0.50 |
| XXXXXX010 | 2 | 0.50 <= x < 1.00 |
| XXXXXX011 | 3 | 1.00 <= x < 2.00 |
| XXXXXX100 | 4 | 2.00 <= x < 4.00 |
| XXXXXX101 | 5 | 4.00 <= x < 8.00 |
| XXXXXX110 | 6 | 8.00 <= x < 16.00 |
| XXXXXX111 | 7 | 16.00 <= x < infinity |

TABLE 2

Phase scintillation level encoding.

| Bits | Decimal | Phase level (m/s) |
|---|---|---|
| XXX000XXX | 0 | Not available |
| XXX001XXX | 1 | 0.00 <= x < 0.01 |
| XXX010XXX | 2 | 0.01 <= x < 0.02 |
| XXX011XXX | 3 | 0.02 <= x < 0.04 |
| XXX100XXX | 4 | 0.04 <= x < 0.08 |
| XXX101XXX | 5 | 0.08 <= x < 0.16 |
| XXX110XXX | 6 | 0.16 <= x < 0.32 |
| XXX111XXX | 7 | 0.32 <= x < infinity |

TABLE 3

Ionospheric spatial gradient level encoding.

| Bits | Decimal | Gradient level (ppm) |
| --- | --- | --- |
| 000XXXXXX | 0 | Not available |
| 001XXXXXX | 1 | 0.00 <= x < 1.00 |
| 010XXXXXX | 2 | 1.00 <= x < 2.00 |
| 011XXXXXX | 3 | 2.00 <= x < 4.00 |
| 100XXXXXX | 4 | 4.00 <= x < 8.00 |
| 101XXXXXX | 5 | 8.00 <= x < 16.00 |
| 110XXXXXX | 6 | 16.00 <= x < 32.00 |
| 111XXXXXX | 7 | 32.00 <= x < infinity |

In one embodiment, a 9-bit message encoded using the exemplary technique illustrated in Tables 1, 2, and 3 may be used to broadcast a satellite-specific amplitude scintillation level, a satellite-specific phase scintillation level, and a satellite-specific ionospheric gradient level, and the corresponding summarizing measures may be computed at the NSS receiver side (see FIG. 5b).

In one embodiment, the region is an equatorial or polar region and generating s10 station-specific and/or satellite-specific ionospheric disturbance information comprises generating both ionospheric scintillation information and ionospheric gradient information. In another embodiment, the region is neither an equatorial nor polar region and generating s10 station-specific and/or satellite-specific ionospheric disturbance information comprises generating ionospheric gradient information but does not comprise generating ionospheric scintillation information. That is, the generation, provision (e.g., sending), and obtention (e.g., receiving) of ionospheric scintillation information may be made dependent on the region under consideration. These embodiments may be implemented for example using a form of geo-fencing in that the ionospheric scintillation mitigation is not enabled in regions where ionospheric scintillation activity is rare, low, or absent (ionospheric scintillation rarely occurs outside of equatorial and polar regions; in contrast, higher-than-normal ionospheric gradients may occur anywhere). These embodiments are advantageous in that they may prevent potential performance degradation (e.g., of a positioning process) if one or more ionospheric scintillation mitigation measures (see discussion with reference to FIGS. 6a to 6e below) are triggered by compromised observables at a base receiver due to, for example, high-multipath.

FIGS. 6a to 6e are flowcharts of methods in five embodiments of the invention, in which ionospheric disturbance mitigation measures are taken after determining that station-specific and/or satellite-specific ionospheric disturbance information indicates an ionospheric disturbance level exceeding a threshold.

The methods illustrated by FIGS. 6a to 6e may be carried out by a NSS receiver configured for observing NSS signals from a plurality of NSS satellites, by another processing entity capable of receiving data from the NSS receiver, or by an NSS receiver in conjunction with such other processing entity (i.e., by an NSS receiver and another processing entity). The processing entity may be located remotely from the NSS receiver and may, for example, receive data representing the NSS observations from the NSS receiver.

The method aims at estimating parameters derived from NSS signals useful to, i.e. suitable to, determine (i.e., estimate) a position, such as a position of a rover receiver (also called "rover system" or simply "rover"). The method may eventually lead to estimating a rover position. In one embodiment, the position is a position relative to a reference point or initial point, whose absolute position need not necessarily be precisely known, and the method may aim at estimating a trajectory relative to the reference point or initial point.

The estimated parameters may for example indicate the most probable number of carrier cycles along the distance separating an NSS satellite from the NSS receiver, i.e. the estimated parameters may be the resolved integer ambiguity (although this is not necessary, as explained below). This also means that the method may estimate the position itself but not necessarily: parameters may be estimated that may be used, for example by another entity (such as a processing entity on a server dedicated to such task), to estimate or determine the position of the NSS receiver (e.g., a rover receiver). Furthermore, other parameters such as, for example, properties of the receiver clock offset and drift may be estimated. Indeed, if the position of both the NSS receiver and the plurality of NSS satellites are known, resolving the integer ambiguities may enable the determination of parameters such as the receiver clock offset.

Yet furthermore, beyond determining the position of a rover, if the position of NSS receivers (such as reference stations) is known, solving the integer ambiguities in the carrier phases by solving observation equations may also be used to eventually estimate the position of a satellite.

However, in some embodiments, it is unnecessary to solve the integer ambiguities in the carrier phases because processing the delta-carrier-phase observables (time-differenced carrier phase observables) cancels out the integer ambiguities. Thus, in these embodiments, the parameters estimated by the method may instead be parameters representing a change in the NSS receiver position based on which a trajectory, i.e. a relative position over time, can be derived.

The application relying on NSS observations to produce an estimate of said parameters, or a combination thereof, may for example be a highly automated driving or autonomous driving application relying on NSS observations to produce an estimate of the position, velocity, or acceleration of a vehicle.

In step s30, at least one estimation process is operated, each estimation process being here referred to as "NSS estimator" and the at least one NSS estimator being here referred to as "NSS estimator set". Each NSS estimator uses state variables and computes values of its state variables based on NSS signals observed by the NSS receiver and/or on information derived from the NSS signals.

Each NSS estimator is or comprises an algorithm, procedure, or process, or a piece of software, firmware, and/or hardware configured for implementing such an algorithm, procedure, or process, in which a set of state variables (or "state vector") is maintained over time, i.e. the values of the state variables are estimated based on measurements made over time. The measurements may comprise data representing the observed NSS signals. The estimator involves or comprises, in one embodiment, a Kalman filter, a least mean squares (LMS) estimator, and/or a robust estimator. The invention is, however, not limited to the use of Kalman filter(s), LMS estimator(s), and/or robust estimator(s). Other estimation processes, filters, or filter techniques may be used.

The estimator's state variables may represent, for example, the position of the NSS receiver, an offset in the position of the NSS receiver relative to another position (the offset per se being therefore a relative position), an offset in the position of the NSS receiver relative to another epoch, the rate of change of the position, the rate of change of the offset in the position, a bias related to the NSS receiver, a bias related to any of the NSS satellites, a bias related to any of the satellite systems, a bias related to any of the NSS signals, the rate of change of any of the said biases, or any combination of the above.

In one embodiment, the method uses a single estimator. In another embodiment, the method uses two estimators. The two estimators may for example be a precise estimator and a timely estimator as described in ref. (see notably, but not only, paragraphs to in ref. [16]).

In step s40, ionospheric disturbance information is obtained. The ionospheric disturbance information may comprise ionospheric disturbance information applicable to a point on or near the surface of the Earth, said ionospheric disturbance information being here referred to as "station-specific ionospheric disturbance information", and/or ionospheric disturbance information applicable to a line of sight between a point on or near the surface of the Earth and a satellite, said ionospheric disturbance information being here referred to as "satellite-specific ionospheric disturbance information". The station-specific ionospheric disturbance information may be, but is not limited to, as described in relation to FIGS. 1 to 4. The ionospheric disturbance information comprises ionospheric scintillation information and/or ionospheric gradient information. In one embodiment, the ionospheric disturbance information comprises ionospheric scintillation information comprising ionospheric amplitude scintillation information and/or ionospheric phase scintillation information.

Similarly to the above discussions of FIGS. 5a and 5b, obtaining s40 the station-specific and/or satellite-specific ionospheric disturbance information may comprise, in one embodiment, receiving, from a reference station or reference station system, the station-specific and/or satellite-specific ionospheric disturbance information, or, in another embodiment, obtaining, internally within the NSS receiver or processing entity capable of receiving data from the NSS receiver, the station-specific and/or satellite-specific ionospheric disturbance information after generating it on the NSS receiver or processing entity based on data from a reference station or reference station system. In particular, as explained above, the reference station's NSS observations—or information representing the reference station's NSS observations—may be transmitted to the NSS receiver side. As also explained above, this is advantageous in terms of flexibility in that this can be done with reference stations (e.g., RTK base stations) that do not support detection and broadcast of ionospheric disturbance information, such as legacy or third-party RTK base station receivers.

In step s50, it is determined that the ionospheric disturbance information indicates an ionospheric disturbance level exceeding a threshold.

In an embodiment wherein the ionospheric disturbance information comprises ionospheric amplitude scintillation information, ionospheric phase scintillation information, and ionospheric gradient information, step s50 may involve converting the amplitude and phase scintillation levels to scale factors using a priori noise models for C/No and ionospheric delay rates. For example, the following may apply:

$$Amplitudescalefactor = \frac{amplitudelevel}{\left(0.2\frac{dBHz}{s}/\sin(elev)\right)}$$

$$Phasescalefactor = \frac{phaselevel}{\left(1\frac{mm}{s}/\sin^2(elev)\right)}$$

where elev is the satellite elevation (radians). The values $$0.2\frac{dBHz}{s} \text{ and } 1\frac{mm}{s}$$

are exemplary empirical values, which were obtained by processing base station data collected in a "clean" GNSS environment (i.e., with low multipath, no ionospheric disturbances). A satellite-specific ionospheric disturbance factor may then be taken as the maximum of the amplitude scale factor, the phase scale factor, and the gradient scale factor (the ionospheric gradient level itself is a scale factor and may be used directly), and the station-specific ionospheric disturbance factor may be computed as the mean of satellite-specific scale factors.

In some embodiments, station-specific ionospheric disturbance information is neither received nor computed at the NSS receiver side. Namely, ionospheric disturbance mitigation measures may be taken directly based on satellite-specific ionospheric disturbance information without having to obtain (receive or compute) any station-specific ionospheric disturbance information.

In some embodiments, station-specific ionospheric disturbance information is received (e.g., broadcast) or computed at the NSS receiver side. This is beneficial to facilitate mitigation decision making at the NSS receiver side.

In some embodiments, both station-specific ionospheric disturbance information and satellite-specific ionospheric disturbance information is received (e.g., broadcast) or computed at the NSS receiver side. This may be beneficial to facilitate mitigation decision making at the NSS receiver side. Furthermore, broadcasting station-specific ionospheric disturbance information avoids a potential loss in precision in the station-specific levels if computed at the NSS receiver side due to the quantization error induced by the 3-bit encoding used for each satellite-specific ionospheric disturbance level.

One or more ionospheric disturbance mitigation measures are then taken for at least one NSS estimator of the NSS estimator set. These mitigation measures may be beneficial because ionospheric disturbances can, as mentioned above, severely degrade the quality of NSS signals received by a NSS receiver and thus, for example, positioning performance. The benefits of these mitigation measures may be noticeably amplified when approaching the peak of a 11-year solar cycle, although these benefits may also arise under other circumstances. Specifically, three mitigation measures are possible, as shown in Table 4.

TABLE 4

| Possible mitigation measures. | |
|---|---|
| Possible measures | Meaning |
| Measure (a) | adapting s60 an ionospheric noise model of the NSS estimator based on the ionospheric disturbance information |
| Measure (b) | switching s70 the NSS estimator to ionospheric free observations |

TABLE 4-continued

Possible mitigation measures.

| Possible measures | Meaning |
|---|---|
| Measure (c) | adapting s80 an observation noise model of the NSS estimator based on the ionospheric disturbance information |

The term "noise model", which is known in the art, refers to a mathematical model representing the expected or assumed value of the error in an observable over time (e.g., code, carrier phase, Doppler, etc.).

Measure (a) may for example involve adapting an ionospheric delay state noise model of a NSS satellite, or of all satellites of the second set of NSS satellites, by upscaling the correlated noise and downscaling the correlation time, as will be explained further below. This may involve adapting ionospheric delay state noise states in a Kalman filter for example.

Measure (b) is advantageous because the impact of ionospheric disturbances can be eliminated or significantly reduced by switching to ionospheric free observable processing. However, ionospheric free carrier phase ambiguities are non-integer (or, more precisely, the ionospheric free carrier phase measurement does have an integer ambiguity; it is, however, almost impossible to fix due to the extremely short wavelength) so that direct ambiguity fixing is not possible. Ambiguity fixing can be done on fundamental frequency band carrier phase, such as for example the GPS L1 carrier phase measurement or the GPS L2 carrier phase measurement. Those have integer ambiguities and their wavelengths are much longer than the ionospheric free combination wavelength. Measure (b) may for example involve switching to estimator to processing delta (i.e., time-differenced) carrier phase observations that are corrected for ionospheric delay.

Measure (c) may for example involve adjusting an observation noise model with the ionospheric disturbance information (such as ionospheric scintillation information), as an ionospheric disturbance can degrade observation quality. In particular, it has been observed that carrier phase noise increases when there is severe amplitude scintillation. Code noise seems to be less significantly impacted by amplitude scintillation. The carrier phase noise may be modeled with correlated noise, correlation time, and uncorrelated noise. Measure (c) may comprise, in one embodiment, increasing uncorrelated noise depending on the amplitude scintillation level. In principle, increasing the correlated noise and/or decreasing the correlation time are also possible.

Further, these three mitigation measures may be combined in different embodiments, as shown in Table 5.

TABLE 5

Combination of mitigation measures per NSS estimator.

Figure 6A:
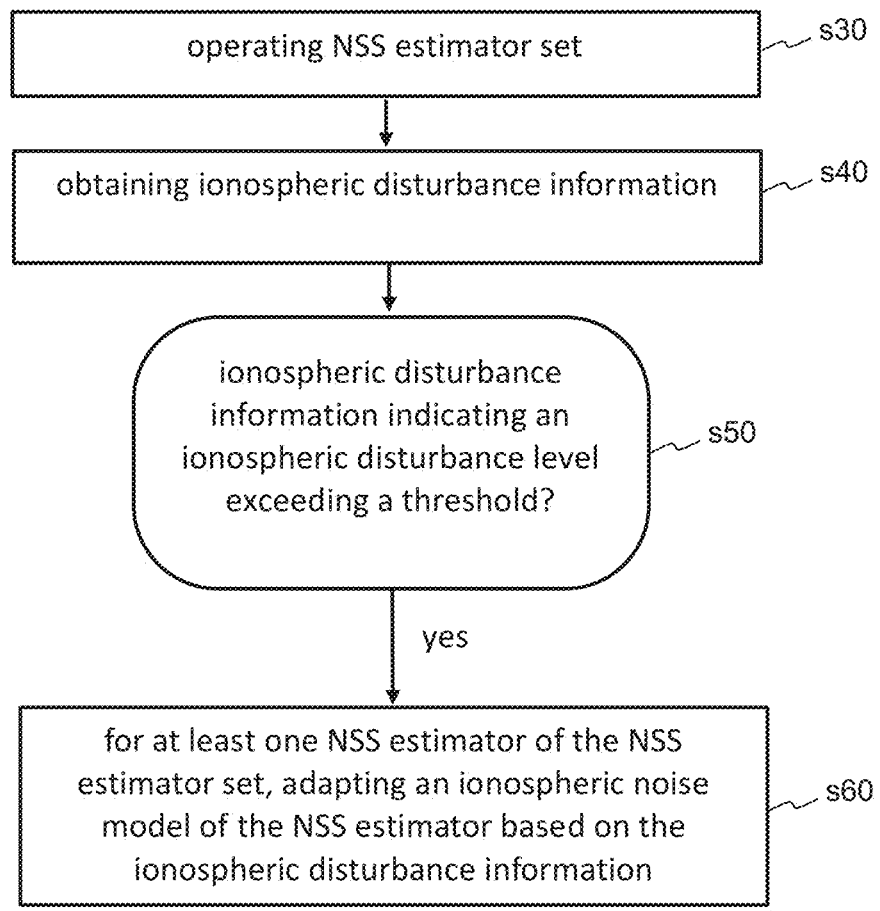
FIGS. 6a to 6e are flowcharts of methods in five embodiments of the invention, in which mitigation measures are taken after determining that ionospheric disturbance information indicates an ionospheric disturbance level exceeding a threshold.
Figure 6B:
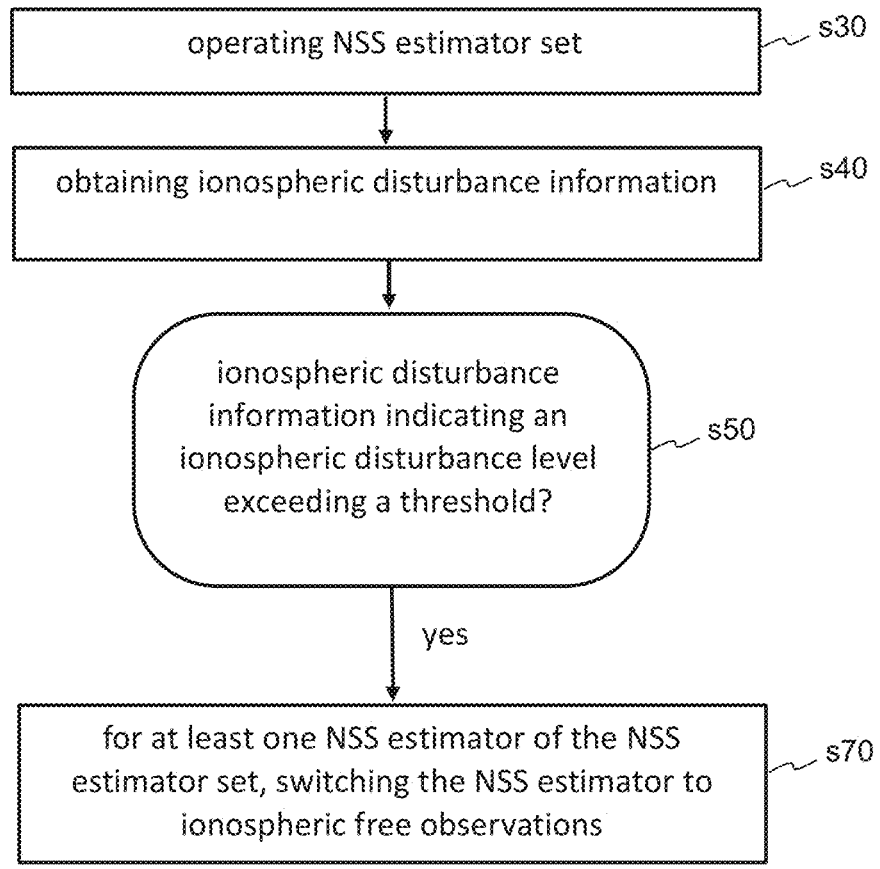
Figure 6C:
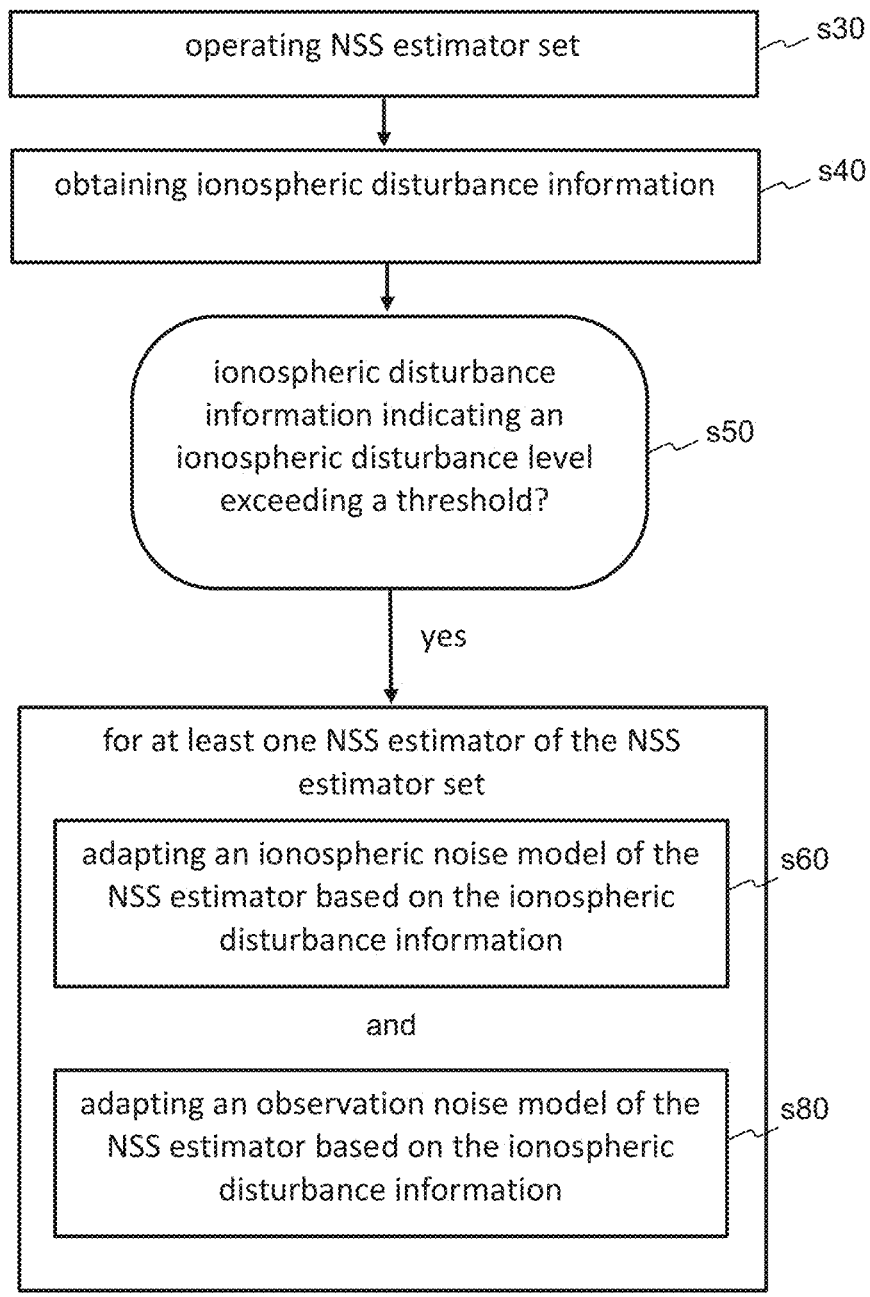
Figure 6D:
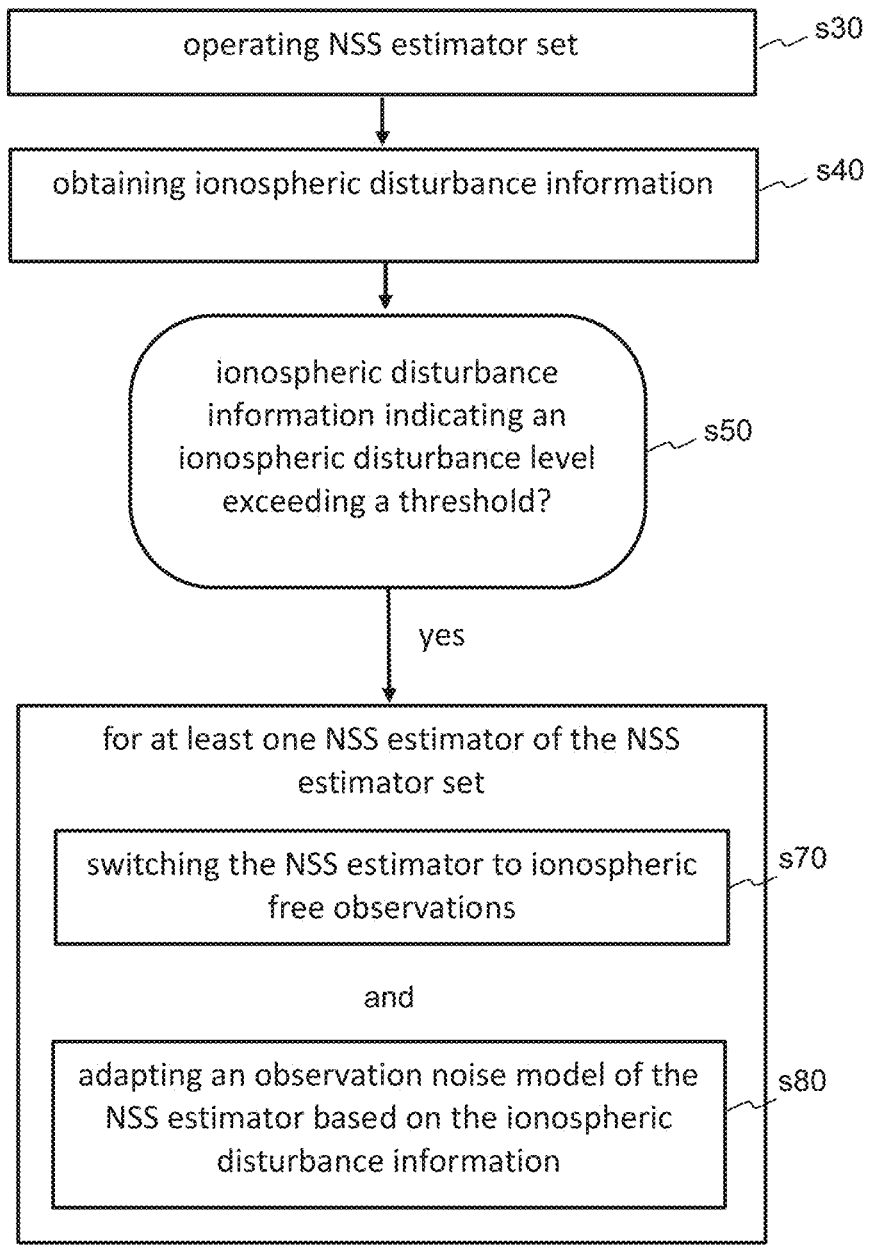
Figure 6E:
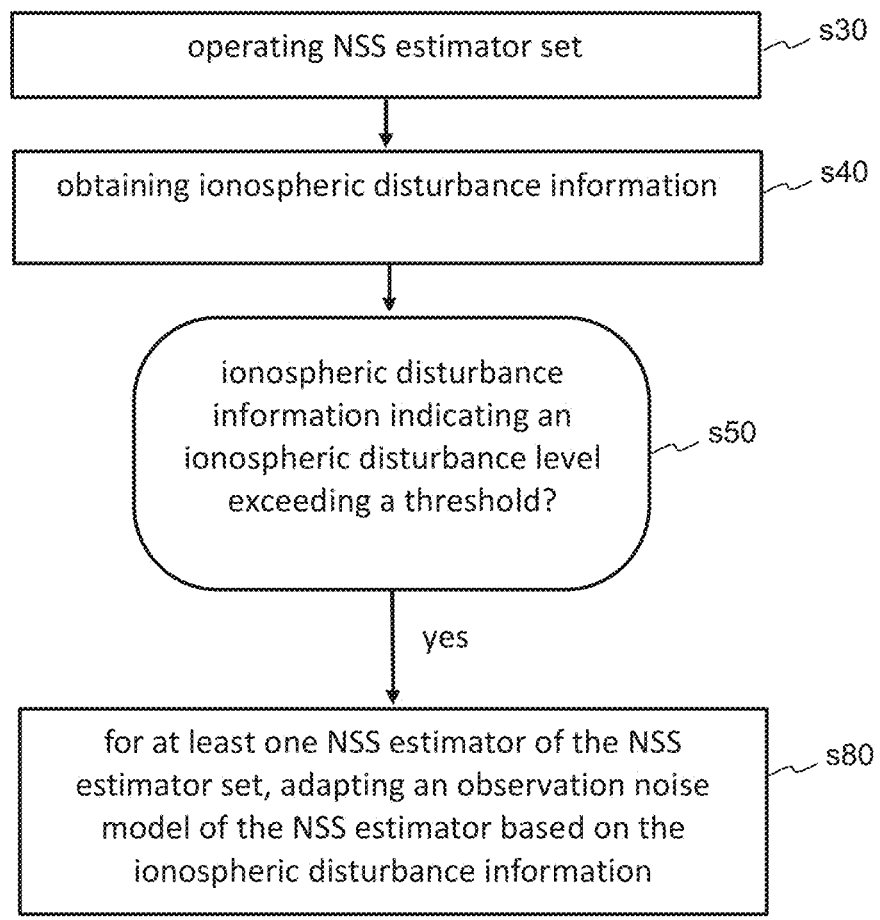

| Combinations | Summary (see Table 4 for more detail) | Illustrated by |
|---|---|---|
| Measure (a) | adapting the ionospheric noise model | FIG. 6a |
| Measure (b) | switching to iono free | FIG. 6b |
| Measures (a) + (c) | adapting the ionospheric noise model and the observation noise model | FIG. 6c |
| Measures (b) + (c) | switching to iono free and adapting the observation noise model | FIG. 6d |
| Measure (c) | adapting the observation noise model | FIG. 6e |

The third combination (i.e., measures (a)+ (c)) and the fourth combination (i.e., measures (b)+ (c)) in Table 5 are advantageous especially if severe scintillation is detected. The last combination (measure (c)) may for example be performed for an estimator that was already operating in ionospheric free observable processing mode.

In one embodiment, adapting s60 an ionospheric noise model comprises applying a scale factor and/or an additive value to the ionospheric noise model.

In one embodiment, the ionospheric noise model is or comprises an ionospheric delay state noise model.

In one embodiment, the ionospheric noise model is or comprises an ionospheric noise model specific to a NSS satellite. Measure (a) may comprise adapting the ionospheric noise model of all the NSS satellites based on a scale factor derived from the satellite-specific scale factors and applied equally to all satellite ionospheric noise models.

In one embodiment, the ionospheric noise model is or comprises a Gauss-Markov noise model. Specifically, the Gauss-Markov noise model may be parametrized by a correlated noise and a correlation time, and then adapting the ionospheric noise model may comprise modifying the correlated noise and/or the correlation time. More specifically, adapting the ionospheric noise model may comprises increasing the correlated noise and/or decreasing the correlation time.

In other words, when ionospheric delay state noise models are adapted, two parameters that define a Gauss-Markov noise model—the correlated noise and the correlation time—may be modified. These two parameters basically define how much the ionospheric delay state is expected to change between two epochs. When there is ionospheric scintillation and/or higher-than-normal ionospheric spatial gradients, the actual correlated noise increases and the actual correlation time decreases. In order to get better estimates of the ionospheric delay, the ionospheric delay state Gauss-Markov noise model is, in one embodiment, adapted to better match the actual noise. The ionospheric disturbance levels obtained from the RTK base are measures of the actual noise and may be used to adapt the Gauss-Markov ionospheric delay state noise models at the rover. From the ionospheric scintillation levels, a scale factor can be derived, and the scale factor is applied to one or both parameters. With the phase scintillation level, the phase scintillation level can be added to the correlated noise. The ionospheric gradient level can be used directly to scale the correlated noise and/or correlation time.

Let us now further explain, in the context of some embodiments, the possible mitigation measures, i.e. steps s60, s70, and s80 as schematically illustrated by FIGS. 6a to 6e.

To obtain good navigation solutions, it is advantageous that the positioning filter(s) (i.e., the estimator(s)) used by GNSS rover receivers remove the influence of ionospheric delay on the code and carrier phase measurements by estimating the differenced ionospheric delay between the RTK base (reference station) and rover (NSS receiver) or by processing single-differenced measurement combinations that are free of ionospheric delay.

When estimating differenced ionospheric delay states, the filter(s) (i.e., the estimator(s)) generally use an a priori stochastic noise model for the states. A Gauss-Markov stochastic model, parameterized by a correlated noise and correlation time, may be used for this purpose and the default values for the parameters are based on the expectation of an undisturbed ionosphere and the length of the baseline between the RTK base (reference station) and rover (NSS receiver). When the ionosphere is disturbed, it is advantageous to adapt the correlated noise and/or correlation time so that the estimated differenced ionospheric delay states better reflect the actual differenced ionospheric delay. The ionospheric disturbance levels received from a RTK base (see FIGS. 6a to 6e) may be used for this purpose. For example, the amplitude and phase scintillation levels may be used to derive a scale factor and/or an additive value that is used to adapt either parameter. The gradient level may also be used directly to scale the correlated noise and/or correlation time.

Another option is to process single-differenced code and carrier phase measurements combinations that are free of ionospheric delay. A potential drawback of this option is that the single-differenced ionospheric free combinations are generally considerably noisier than the noise of the primary frequency band measurements used to form the combination. On short baselines, where the differenced ionospheric delay mostly cancels when forming single-differenced observations between the base and rover receivers, the observable noise-to-bias ratio is such that it is better to use the primary band measurements directly. On longer baselines, where the ionospheric delay does not cancel when forming single-differenced observations between the base and rover receivers, the ratio is such that it is better to use the ionospheric delay free combinations. Many RTK users operate their rovers relatively close to the RTK base stations and require low noise navigation solutions. However, when the ionosphere is disturbed, the ionospheric delay may not cancel on short baselines and the observable noise-to-bias ratio is such that the ionospheric delay free combination may give better positioning results. The ionospheric disturbance levels received from a RTK base (see FIGS. 6a to 6e) may be used to decide when it is better to use ionospheric delay free measurements combinations rather than primary band measurements.

In one embodiment, if an estimator operating on a rover receiver is operating with ionospheric free observations and ionospheric disturbance information indicates an ionospheric disturbance level below a threshold (i.e., a period of disturbance ended), the estimator may be switched back to normally processing ionospheric observations, i.e. the estimator may be switch back to the normal process such as for example to multi-frequency time-differenced carrier phase observation processing.

Let us now further discuss the station-specific and/or satellite-specific amplitude scintillation adaptation in some embodiments of the invention.

When the station-specific and/or satellite-specific amplitude scintillation level is higher than a threshold, a scale factor or additive value may be derived and applied to the ionospheric delay state Gauss-Markov noise model of each satellite.

A scale factor may be derived by normalizing the amplitude scintillation levels using the expected level noise which is largely a function of the expected noise of the $C/N_0$ rate measurements used to estimate the amplitude scintillation levels.

The expected variance of the amplitude scintillation levels is:

$$\sigma^2_{\beta(tn)} = (0.125)^2/\sin(elev) \qquad \text{(Equation 12)}$$

where
$\sigma_{\beta(tn)}^2$ is amplitude scintillation level variance at epoch $t_n$ $((dBHz/s)^2)$
elev is the satellite elevation (radians).
The normalized amplitude scintillation level is therefore:

$$|\beta(t_n)1 = \beta(t_n)/\sigma_{\beta(tn)}$$

where $\sigma_{\beta(tn)}$ is the amplitude scintillation level standard deviation at epoch $t_n$ Assuming the amplitude scintillation level measurements are normally distributed, a normalized level of 1 means that there is a 68% probability of amplitude scintillation, a level of 2 means that there is a 95% probability of amplitude scintillation, and a level of 3 means that there is a 99.7% probability of amplitude scintillation. When there is a sufficiently high probability that amplitude scintillation is occurring, the normalized level can be used directly to upscale the Gauss-Markov correlated noise and downscale the Gauss-Markov correlation time.

Alternatively, if the rover navigation filter (estimator) is not estimating ionospheric delay states, a switch to ionospheric delay free measurements may be triggered when the amplitude scintillation level exceeds a threshold.

Let us now further discuss the station-specific and/or satellite-specific phase scintillation adaptation in some embodiments of the invention.

Similar to amplitude scintillation adaptation, when the phase scintillation level is higher than a threshold, a scale factor or additive value may be derived and applied to the ionospheric delay state Gauss-Markov noise model for each satellite.

A scale factor may be derived by normalizing the phase scintillation levels using the expected level noise which is largely a function of the expected noise of the carrier phase measurements used to estimate the phase scintillation levels.

The expected variance of the phase scintillation levels is:

$$\sigma^2_{\Phi(tn)} = (0.001)^2/\sin^2(elev) \qquad \text{(Equation 13)}$$

where
$\sigma_{\Phi(tn)}^2$ is phase scintillation level variance at epoch $t_n$ $((m/s)^2)$
elev is the satellite elevation (radians).
The normalized phase scintillation level is therefore:

$$|\Phi(t_n)| = \Phi(t_n)/\sigma_{\Phi(tn)}$$

where $\sigma_{\Phi(tn)}$ is the phase scintillation level standard deviation at epoch $t_n$.

Assuming the phase scintillation level measurements are normally distributed, a normalized level of 1 means that there is a 68% probability of phase scintillation, a level of 2 means that there is a 95% probability of phase scintillation and a level of 3 means that there is a 99.7% probability of phase scintillation. When there is a sufficiently high probability that phase scintillation is occurring, the normalized level may be used directly to upscale the Gauss-Markov correlated noise and downscale the Gauss-Markov correlation time.

Alternatively, if the rover navigation filter is not estimating ionospheric delay states, a switch to ionospheric delay free measurements may be triggered when the phase scintillation level exceeds a threshold.

Let us now further discuss the station-specific and/or satellite-specific ionospheric spatial gradient adaptation in some embodiments of the invention.

The time-step ionospheric delay spatial gradient level computed for each satellite is a measure of how much the ionospheric delay is expected to change over distance near the ionospheric pierce point (IPP) along the line of sight between the RTK base and satellite. As such, the ionospheric gradient level can be used to adapt the Gauss-Markov stochastic models used for the RTK base to rover satellite differenced ionospheric delay states. This may be done by scaling the Gauss-Markov stochastic model correlated noise value by the ionospheric delay gradient level.

Figure 7A:
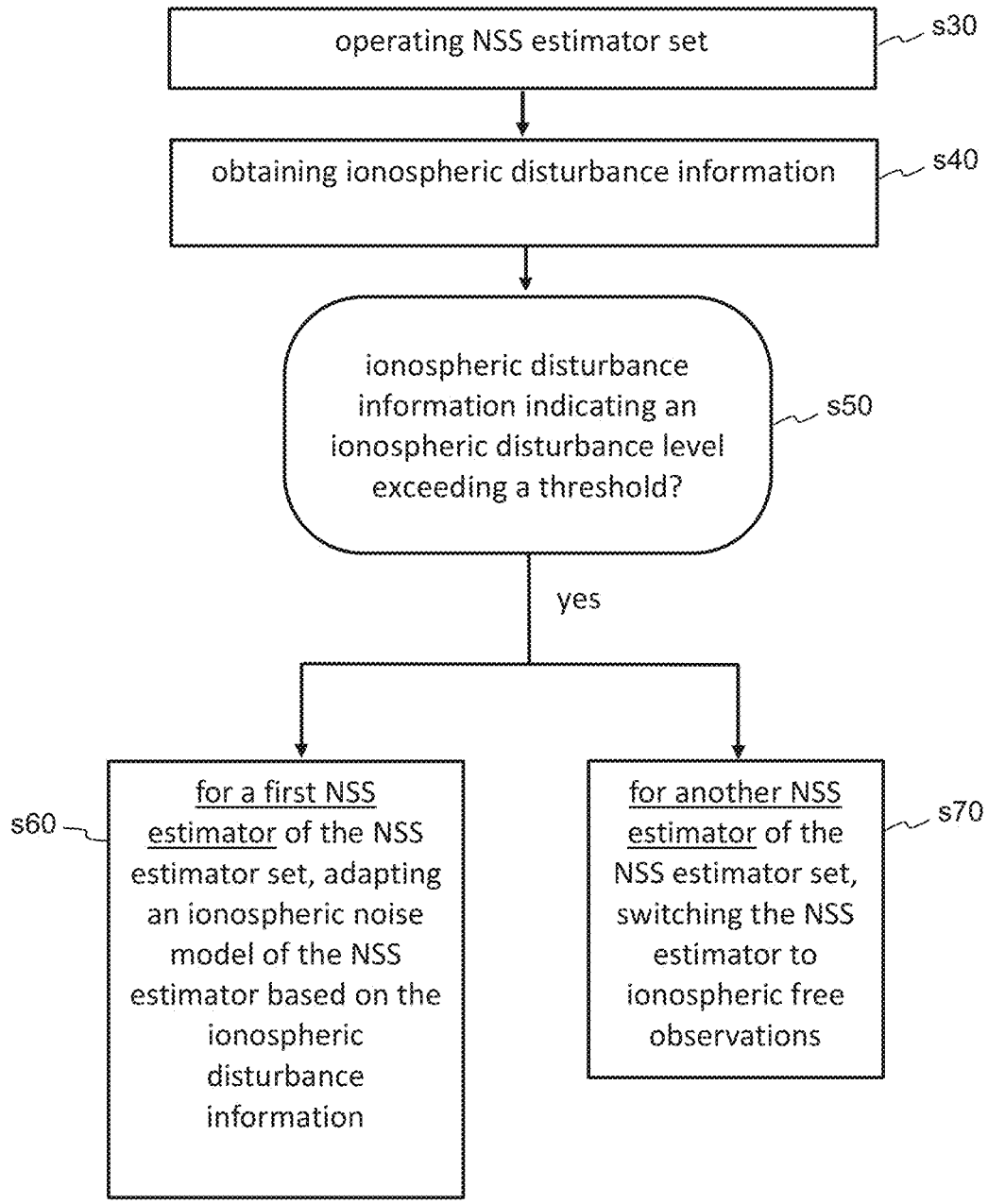
FIGS. 7a and 7b are flowcharts of methods in two embodiments of the invention, in each of which mitigation measures are taken for two estimators.
Figure 7B:
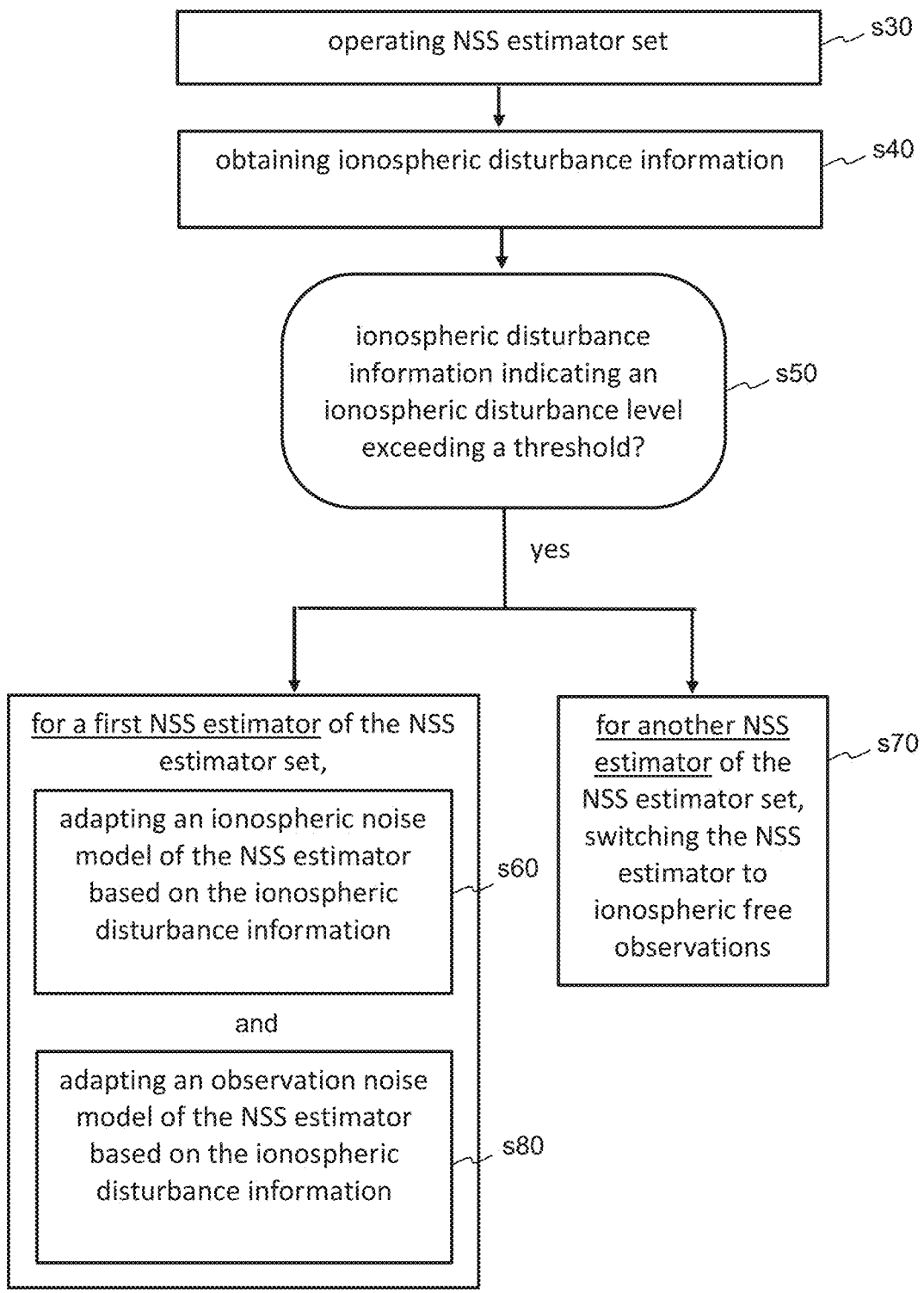

FIGS. 7a and 7b are flowcharts of methods in two exemplary embodiments of the invention, in which ionospheric disturbance mitigation measures are taken for each of two different estimators, which, as mentioned above, may for example be a precise estimator and a timely estimator as described in ref. [16]. In FIG. 7a, measure (a) (step s60) is performed for a first NSS estimator, whereas measure (b) (step s70) is performed for a second NSS estimator. In FIG. 7b, measures (a) and (c) (steps s60 and s80) are performed for a first NSS estimator, whereas measure (b) (step s70) is performed for a second NSS estimator. Other combinations may be used as well (not illustrated).

For example, different mitigation measures may be taken a precise estimator and a timely estimator as described in ref. [16] in that, when a station-specific or satellite-specific ionospheric disturbance factor exceeds a threshold, (i) the precise estimator's satellite ionospheric delay state noise model is adapted by upscaling the correlated noise and downscaling the correlation time and (ii) the timely estimator switches to ionospheric-free carrier phase combination—for all the satellites or only for the satellites affected by ionospheric disturbance (i.e., for which the threshold is exceeded)—, i.e. processing delta (i.e., time-differenced) carrier phase observations that are corrected for ionospheric delay.

Figure 11:
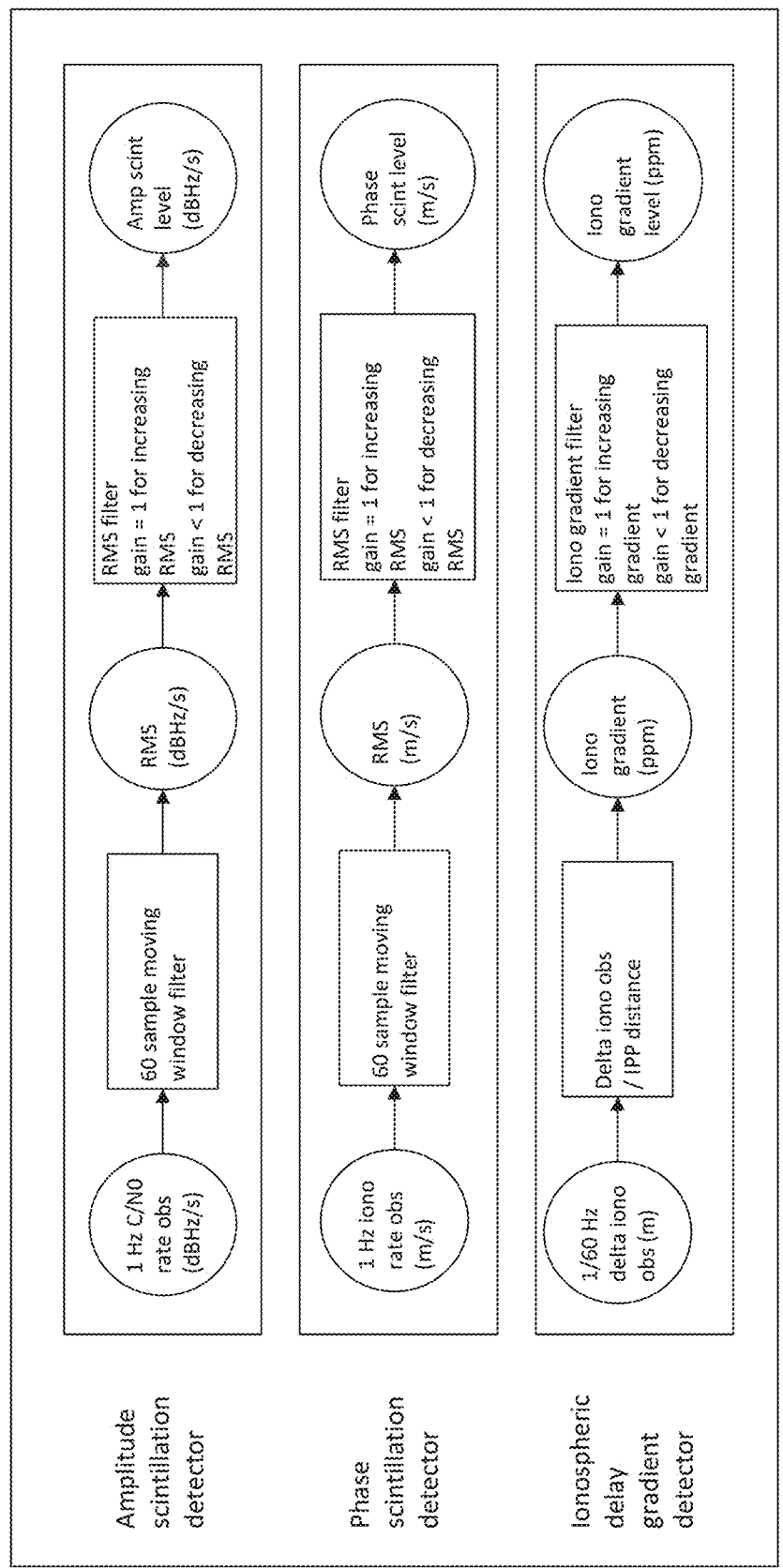
FIG. 11 is a schematic diagram of exemplary processes for computing three satellite-specific ionospheric disturbance levels comprising respectively an amplitude scintillation level, a phase scintillation level, and an ionospheric gradient level, in embodiments of the invention.

FIG. 11 is a schematic diagram of exemplary processes for computing three satellite-specific ionospheric disturbance levels comprising respectively a satellite-specific amplitude scintillation level, a satellite-specific phase scintillation level, and a satellite-specific ionospheric gradient level, in embodiments of the invention.

Figure 12:
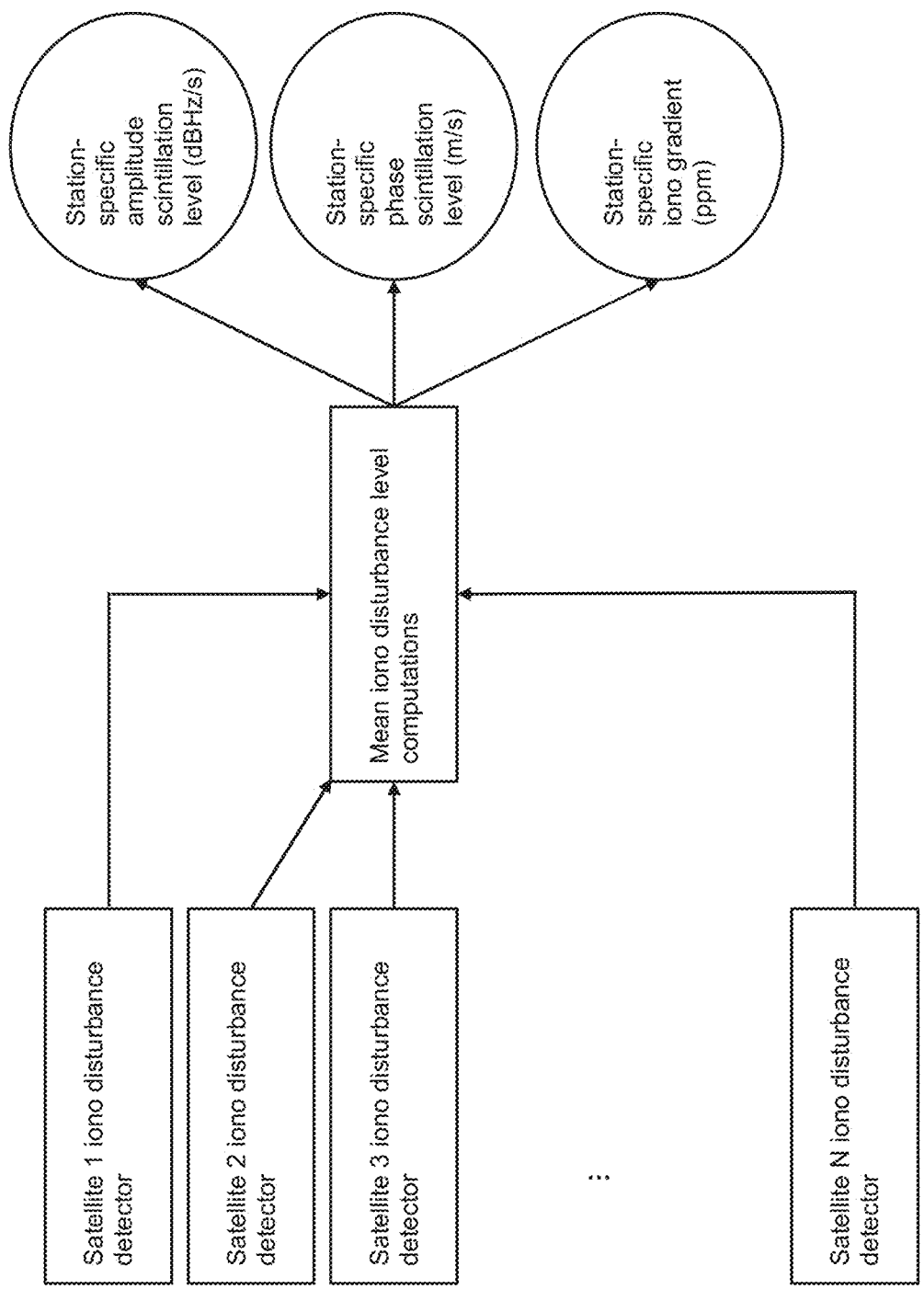
FIG. 12 is a schematic diagram of exemplary processes of computing ionospheric-disturbance-levels-summarizing measures, in embodiments of the invention.

FIG. 12 is a schematic diagram of exemplary processes of computing ionospheric-disturbance-levels-summarizing measures, in embodiments of the invention.

Figure 13:
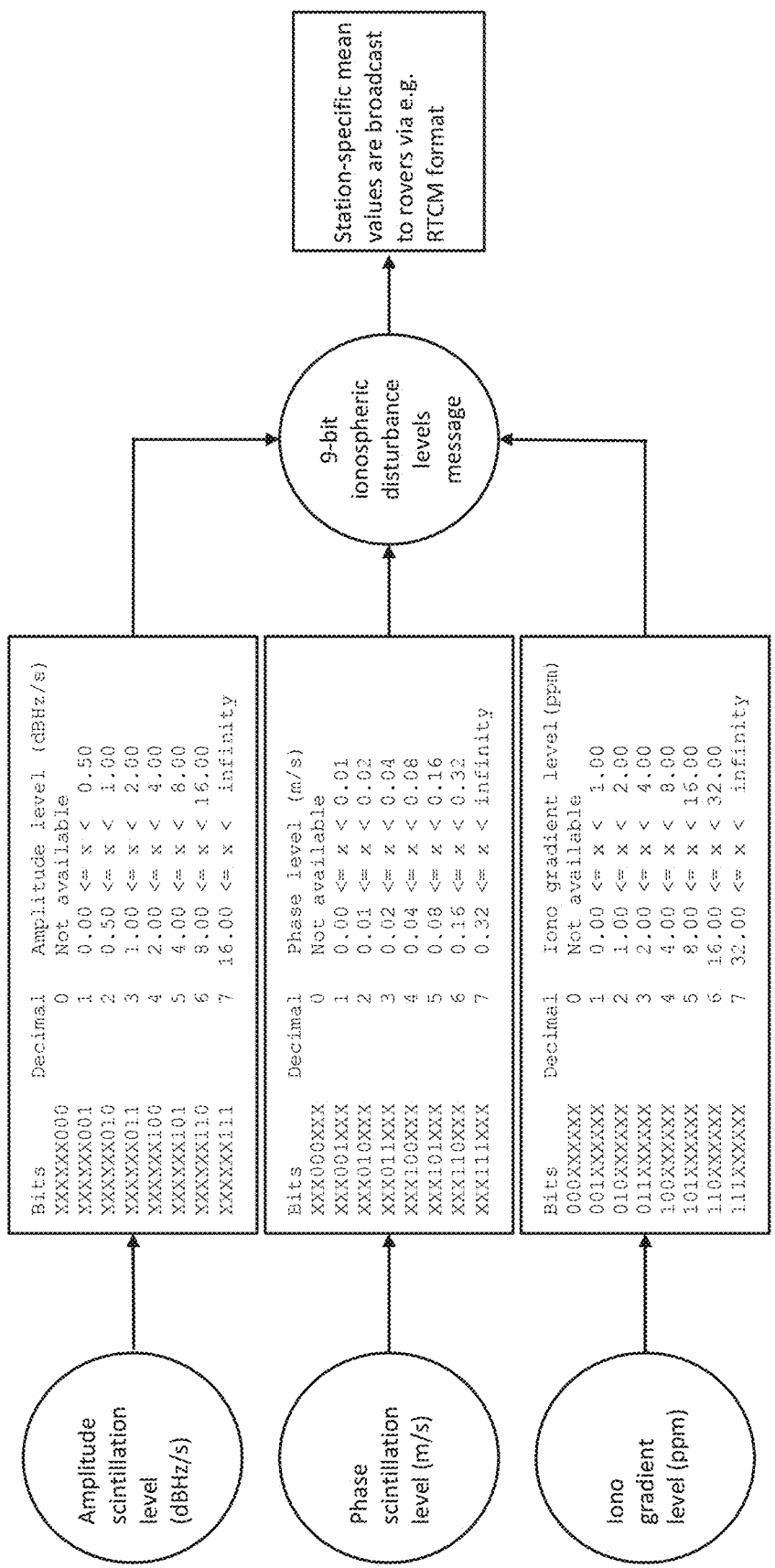
FIG. 13 is a schematic diagram of an exemplary process of creating a message comprising station-specific ionospheric disturbance information, in one embodiment of the invention.

FIG. 13 is a schematic diagram of an exemplary process of creating a 9-bit message comprising station-specific ionospheric disturbance information, in one embodiment of the invention. The message may be broadcast using the RTCM format or any other suitable format. Similar messages may be used to broadcast satellite-specific ionospheric disturbance information in some embodiments of the invention.

Figure 14:
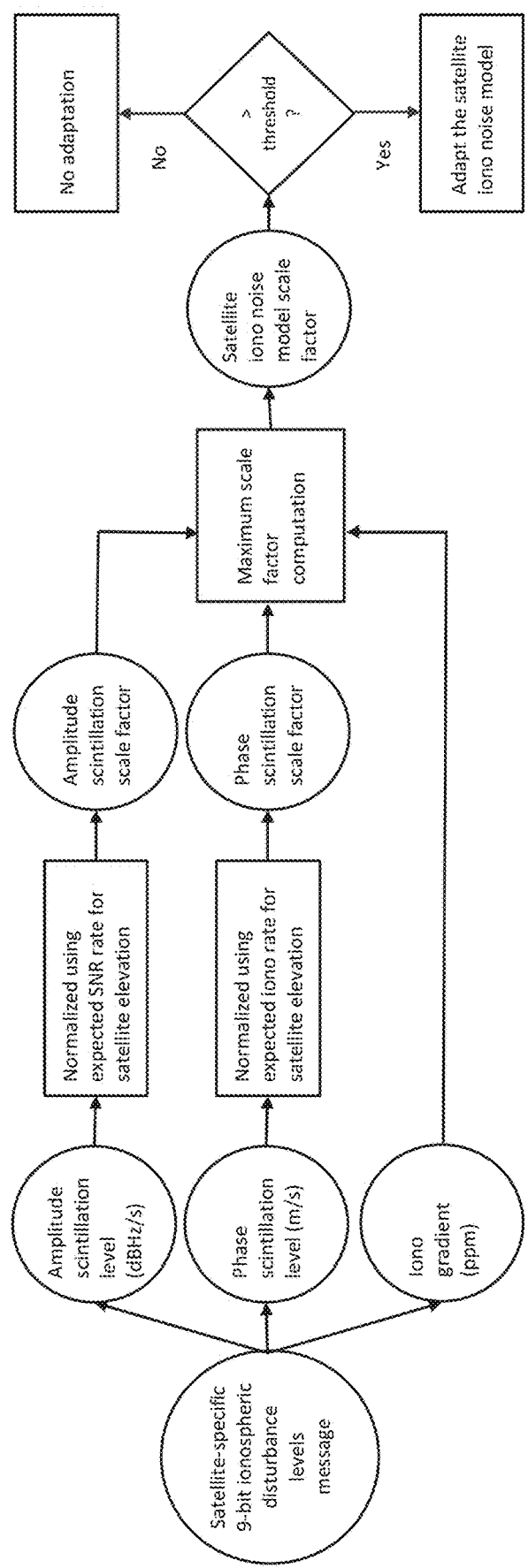
FIG. 14 is a schematic diagram of an exemplary process of receiving messages comprising satellite-specific ionospheric disturbance information, and processing that information, in one embodiment of the invention.

FIG. 14 is a schematic diagram of an exemplary process of receiving messages comprising satellite-specific ionospheric disturbance information, and processing that information for ionospheric disturbance purposes, in one embodiment of the invention.

Figure 15:
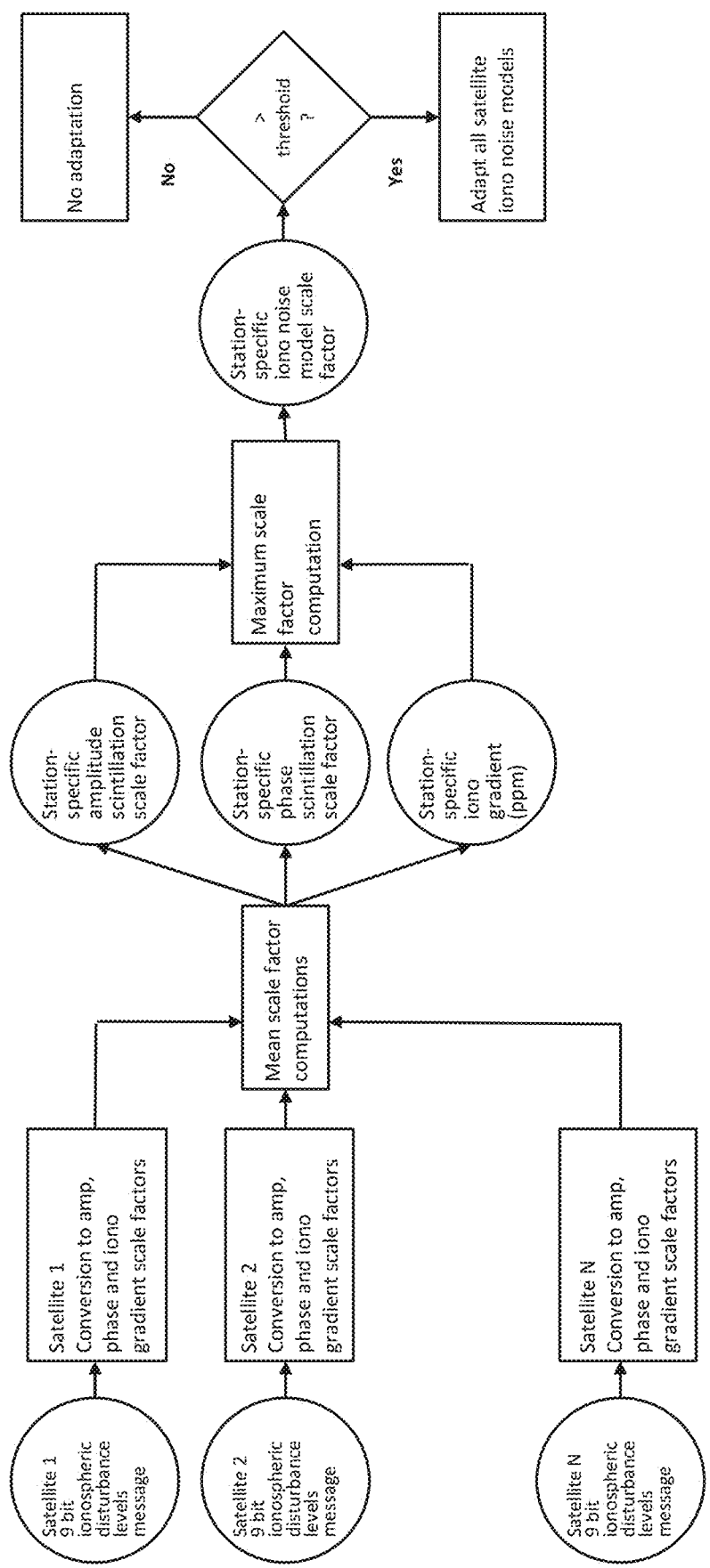
FIG. 15 is a schematic diagram of an exemplary process of receiving messages comprising satellite-specific ionospheric disturbance information, generating station-specific ionospheric disturbance information, and processing that information, in one embodiment of the invention.

FIG. 15 is a schematic diagram of an exemplary process of receiving messages comprising satellite-specific ionospheric disturbance information, generating station-specific ionospheric disturbance information, and processing that information for ionospheric disturbance purposes, in one embodiment of the invention. More specifically, FIG. 15 shows how a station-specific scale factor to be applied to the ionospheric delay noise models for all satellites may be generated. Station-specific scale factors are computed based on the mean of satellite-specific scale factors derived from the satellite-specific amplitude scintillation, phase scintillation and ionospheric gradient levels. Three station-specific scale factors are then obtained based on the mean amplitude scintillation, phase scintillation and ionospheric gradient levels. If the maximum of these three scale factors exceeds some threshold, it is used to adapt all the satellite ionospheric delay noise models equally.

Figure 16A:
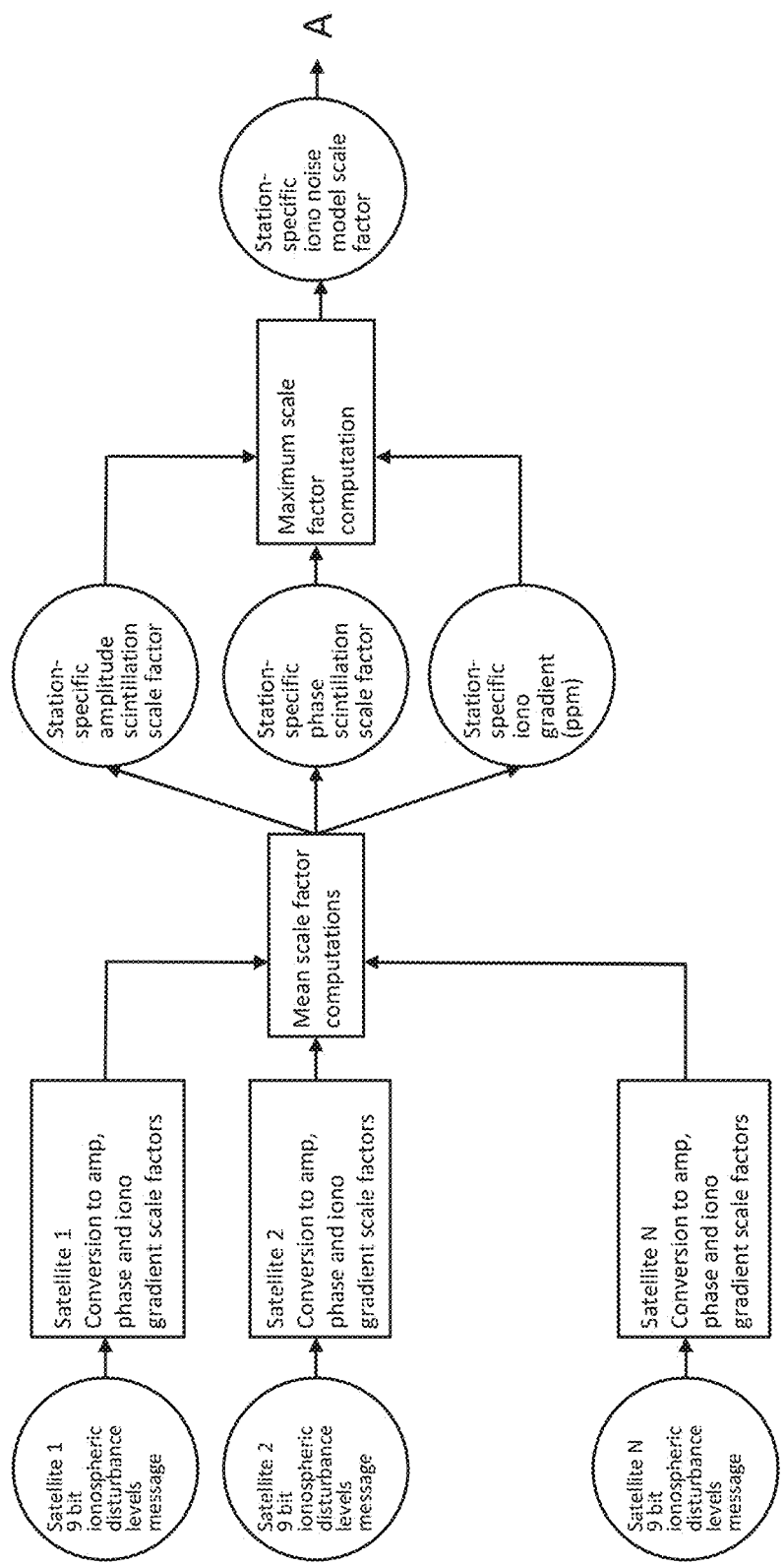
FIGS. 16a, 16b, and 16c, which are to be read together, schematically illustrate a method in which both station-specific ionospheric disturbance information and satellite-specific ionospheric disturbance information are processed, in one embodiment of the invention.
Figure 16B:
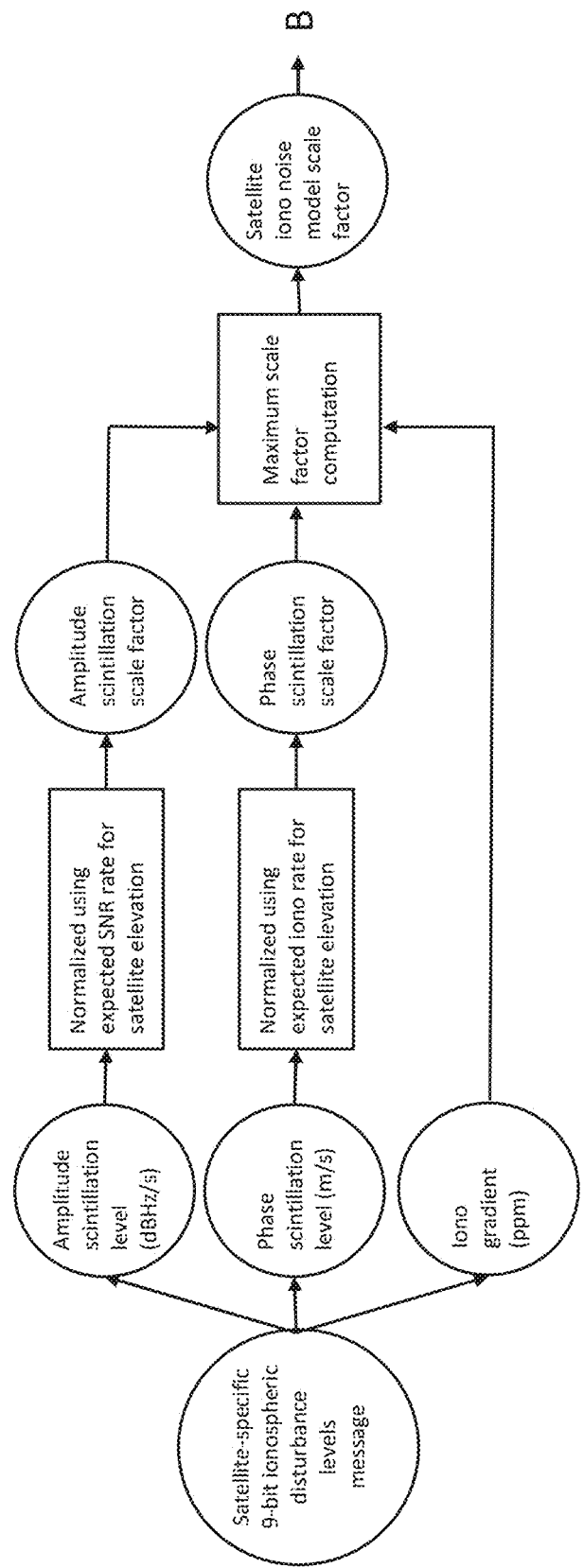
Figure 16C:
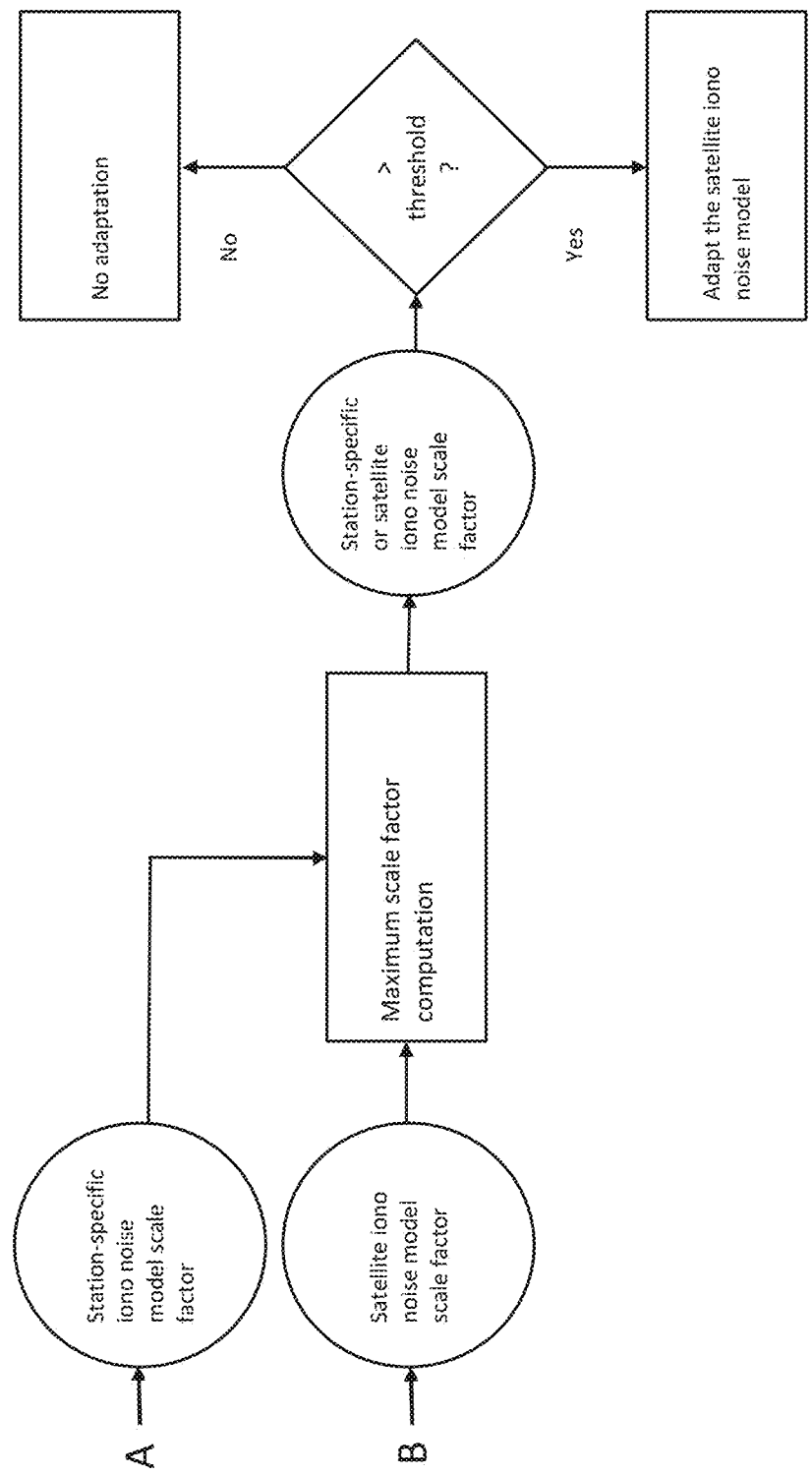

FIGS. 16a, 16b, and 16c, which are to be read together, schematically illustrate a method in which both station-specific ionospheric disturbance information and satellite-specific ionospheric disturbance information are processed for ionospheric disturbance purposes, in one embodiment of the invention. Specifically, FIG. 16a schematically illustrates a process of generating station-specific ionospheric disturbance information, FIG. 16b schematically illustrates a process of generating satellite-specific ionospheric disturbance information, and FIG. 16c takes the maximum of both (i.e., the maximum of a station-specific ionospheric noise model scale factor—from "A" in FIGS. 16a and 16c—and a satellite-specific ionospheric noise model scale factor—from "B" in FIGS. 16b and 16c—) to decide whether to adapt the ionospheric noise model associated with the satellite under consideration. This may be repeated for each satellite. Regarding FIG. 16a, see the discussion of FIG. 15. FIG. 16b shows the process for adapting the ionospheric delay noise model for each satellite independently. The amplitude and phase scintillation 3-bit values are converted to SNR and iono delay rates in units of dBHz/s and m/s, respectively. These are then normalized using the SNR and ionospheric delay rates expected for a quiet ionosphere which gives scale factors based on amplitude and phase scintillation levels. The ionospheric gradient bit value is converted to an ionospheric gradient in ppm. This is already a scale factor. If the maximum of the three scale factors exceeds some threshold, it is used to adapt the satellite's ionospheric delay noise model.

Figure 17:
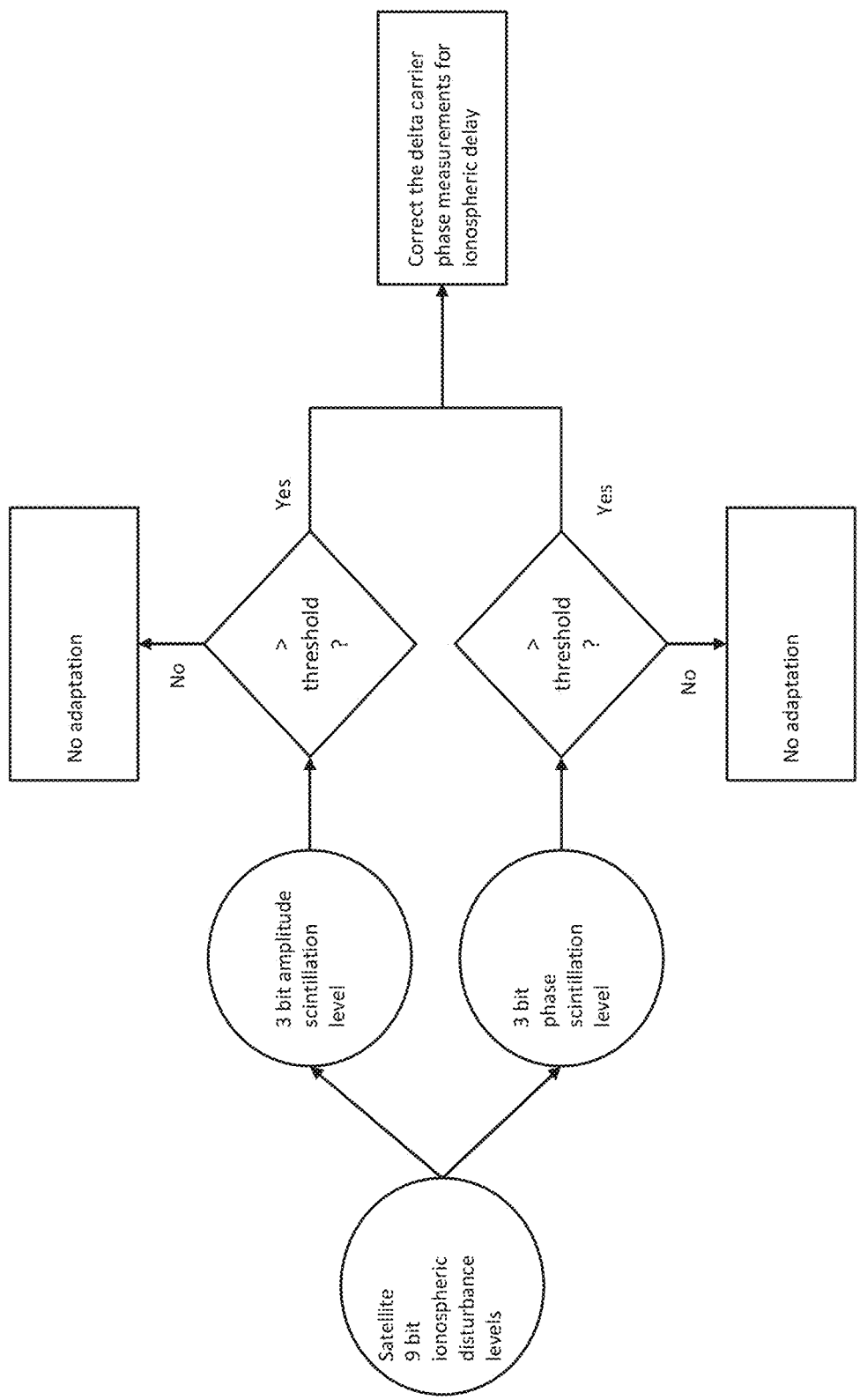
FIG. 17 is a schematic diagram of an exemplary process of receiving messages comprising satellite-specific ionospheric disturbance information, and processing that information, in one embodiment of the invention.

FIG. 17 is a schematic diagram of an exemplary process of receiving messages comprising satellite-specific ionospheric disturbance information, and processing that information for ionospheric disturbance purposes, in one embodiment of the invention. More specifically, a decision is made as to whether or not to correct the processed carrier phase measurement from one satellite for ionospheric delay. If the amplitude scintillation or phase scintillation level for the satellite exceeds some threshold, the correction is applied. If neither exceeds the threshold, no correction is applied.

In one embodiment, not only station-specific ionospheric disturbance information is provided (step s20) and obtained (step s40), but also satellite-specific ionospheric disturbance information. The usefulness of such an embodiment is for example schematically illustrated in FIGS. 16a, 16b, and 16c.

In one embodiment, satellite-specific ionospheric disturbance information is obtained (step s40) and no station-specific ionospheric disturbance information is obtained.

In one embodiment (not illustrated in the drawings), the method described with reference to any one of FIGS. 6a to 6e, 7a and 7b, comprises a step of observing NSS signals. That is, in this embodiment, steps s30, s40, s50, and any one of steps s60, s70, and/or s80 (see possible combinations in Table 5) are carried out at least by an NSS receiver, and the NSS receiver also observes NSS signals.

In another embodiment (not illustrated in the drawings), an NSS receiver observes NSS signals and the NSS receiver transmits data representing the observed NSS signals, or information derived therefrom, to another processing entity or set of processing entities in charge of carrying out steps s30, s40, s50, etc., which then receives the data representing the observed NSS signals, or information derived therefrom.

System

Figure 18:
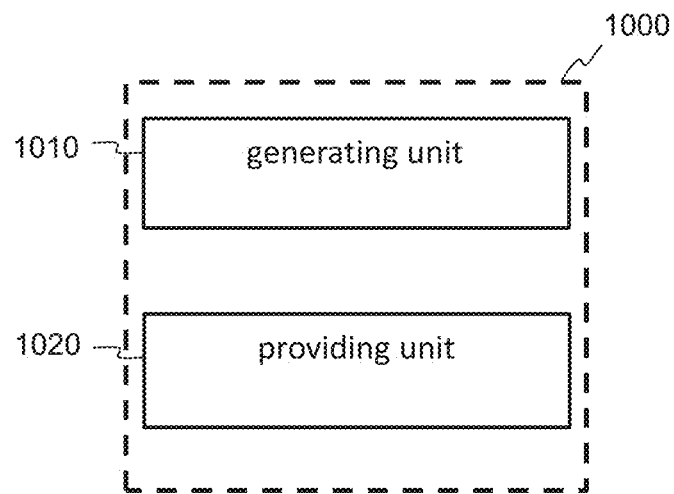
FIG. 18 schematically illustrates a system in one embodiment of the invention.

FIG. 18 schematically illustrates a system 1000 in one embodiment of the invention, for providing ionospheric disturbance information applicable to a region of the Earth and suitable for use by a NSS receiver and/or a processing entity capable of receiving data from the NSS receiver. The ionospheric disturbance information may help in computing a positioning solution based on NSS signals received by the NSS receiver from a plurality of NSS satellites, hereinafter referred to as "first set of NSS satellites". System 1000 comprises one or more computers and/or servers, or more generally by any number of processing entities implemented in hardware, firmware, and/or software. Part of system 1000 may also encompass a NSS receiver and/or a processing entity capable of receiving data from the NSS receiver. System 1000 comprises a generating unit 1010 configured to perform generating step s10 as described above (see FIGS. 1 to 4) and a providing unit 1020 configured to perform providing step s20 as described above (see FIGS. 1 to 4 as well).

Figure 19:
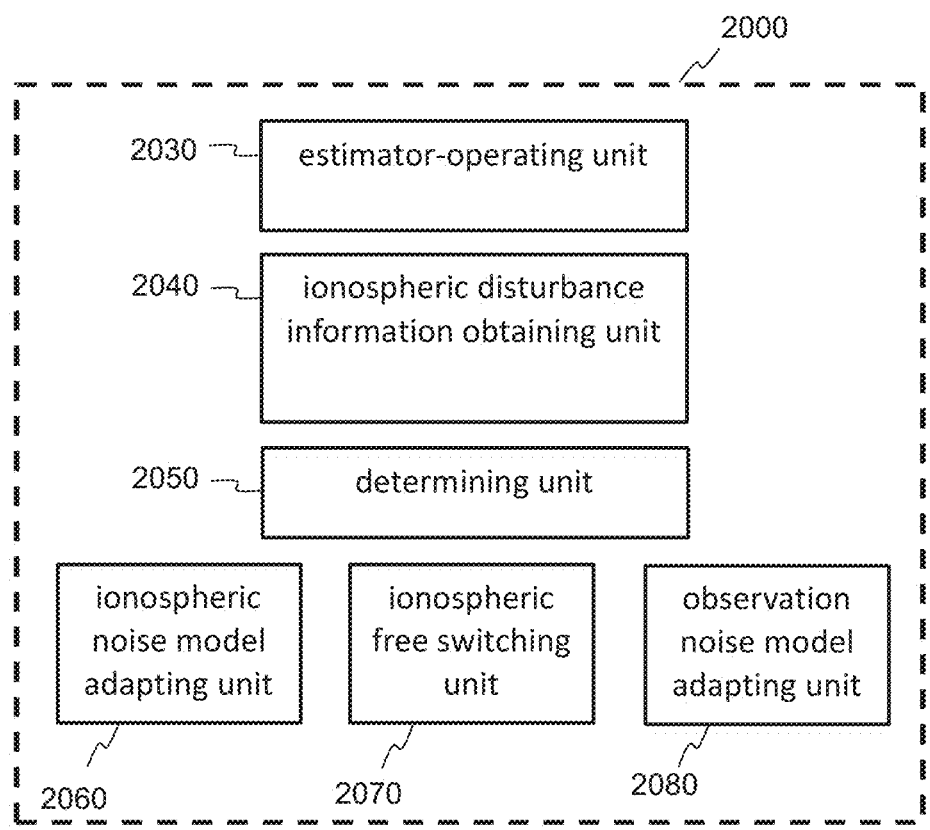
FIG. 19 schematically illustrates a system in another embodiment of the invention.

FIG. 19 schematically illustrates a system 2000 in another embodiment of the invention. System 2000 comprises an NSS receiver and/or a processing entity capable of receiving data from the NSS receiver. System 2000 operates to estimate parameters derived from NSS signals useful to, i.e. suitable to, determine a position. The NSS receiver is configured for observing at least one NSS signal from each of a plurality of NSS satellites over multiple epochs. System 2000 comprises (i) an estimator-operating unit 2030 configured to performing step s30 as described above (see FIGS. 6a to 7b), (ii) an ionospheric disturbance information obtaining unit 2040 configured to performing step s40 as described above (see FIGS. 6a to 7b as well), (iii) a determining unit 2050 configured to performing step s50 as described above (see FIGS. 6a to 7b as well), and (iv) at least one of: an ionospheric noise model adapting unit 2060 configured to performing step s60 as described above, an ionospheric free switching unit 2070 configured to performing step s70 as described above, and an observation noise model adapting unit 2080 configured to performing step s80 as described above.

In one embodiment, a vehicle comprises a system 2000 as described above. The vehicle may for example be an autonomous vehicle such as a self-driving vehicle, a driverless vehicle, a robotic vehicle, a highly automated vehicle, a partially automated vehicle, an aircraft, or an unmanned aerial vehicle. The vehicle may for example be a car, a truck, a bus, a motorcycle, a tractor, a combine harvester, a crop sprayer, a construction equipment, a grader, or a train. Exemplary applications may include machine guidance, construction work, operation of unmanned aerial vehicles (UAV), also known as drones, and operation of unmanned surface vehicles/vessels (USV).

Additional Remarks

Any of the above-described methods and their embodiments may be implemented, at least partially, by means of a computer program or a set of computer programs. The computer program(s) may be loaded on an apparatus, such as for example an NSS receiver (running on a rover station, on a reference station, or within a vehicle) or a server (which may comprise one or a plurality of computers). Therefore, the invention also relates, in some embodiments, to a computer program or set of computer programs, which, when carried out on an apparatus as described above, such as for example an NSS receiver (running on a rover station, on a reference station, or within a vehicle) or a server, carries out any one of the above-described methods and their embodiments.

The invention also relates, in some embodiments, to a computer-readable medium or a computer-program product including the above-mentioned computer program. The computer-readable medium or computer-program product may for instance be a magnetic tape, an optical memory disk, a magnetic disk, a magneto-optical disk, an SSD, a CD-ROM, a DVD, a CD, a flash memory unit, or the like, wherein the computer program is permanently or temporarily stored. In some embodiments, a computer-readable medium (or to a computer-program product) has computer-executable instructions for carrying out any one of the methods of the In one embodiment, a computer program as claimed may be delivered to the field as a computer program product, for example through a firmware or software update to be installed on receivers (rovers or reference stations) already in the field. This applies to each of the above-described methods and apparatuses.

NSS receivers may include one or more antennas, configured to receive the signals at the frequencies broadcasted by the satellites, processor units, one or a plurality of accurate clocks (such as crystal oscillators), one or a plurality of central processing units (CPU), one or a plurality of memory units (RAM, ROM, flash memory, or the like), and a display for displaying position information to a user.

Where the terms "generating unit", "providing unit", "estimator-operating unit", "ionospheric disturbance information obtaining unit", etc. are used herein as units (or sub-units) of an apparatus (such as an NSS receiver), no restriction is made regarding how distributed the constituent parts of a unit (or sub-unit) may be. That is, the constituent parts of a unit (or sub-unit) may be distributed in different software or hardware components or devices for bringing about the intended function. Further, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding and are not intended to limit the scope of the invention. The scope of the invention is defined by the appended claims.

Further embodiments E1 to E14 part of the disclosure are as follows:

E1. Method, carried out by at least one of a navigation satellite system, hereinafter abbreviated as "NSS", receiver, and a processing entity capable of receiving data from the NSS receiver, for estimating parameters useful to determine a position, the NSS receiver observing NSS signals from NSS satellites, the method comprising:

operating (s30) at least one estimation process, each estimation process being hereinafter referred to as "NSS estimator" and the at least one NSS estimator being hereinafter referred to as "NSS estimator set", wherein each NSS estimator uses state variables and computes values of its state variables based on at least one of: NSS signals observed by the NSS receiver, and information derived from the NSS signals;

obtaining (s40) ionospheric disturbance information comprising at least one of: ionospheric scintillation information and ionospheric gradient information;

determining (s50) that the ionospheric disturbance information indicates an ionospheric disturbance level exceeding a threshold; and, for at least one NSS estimator of the NSS estimator set, performing at least one of a first operation and a second operation, wherein the first operation comprises:
adapting (s60) an ionospheric noise model of the NSS estimator based on the ionospheric disturbance information; or
switching (s70) the NSS estimator to ionospheric free observations; and the second operation comprises:
adapting (s80) an observation noise model of the NSS estimator based on the ionospheric disturbance information.

E2. Method of embodiment E1, wherein the ionospheric disturbance information comprises at least one of:
ionospheric disturbance information applicable to a point on or near the surface of the Earth, said ionospheric disturbance information being hereinafter referred to as "station-specific ionospheric disturbance information"; and
ionospheric disturbance information applicable to a line of sight between a point on or near the surface of the Earth and a satellite, said ionospheric disturbance information being hereinafter referred to as "satellite-specific ionospheric disturbance information".

E3. Method of embodiment E1 or E2, wherein the ionospheric disturbance information comprises ionospheric scintillation information comprising at least one of:
ionospheric amplitude scintillation information, and
ionospheric phase scintillation information.

E4. Method according to any one of embodiments E1 to E3, wherein adapting (s60) an ionospheric noise model comprises applying at least one of a scale factor and an additive value to the ionospheric noise model.

E5. Method according to any one of embodiments E1 to E4, wherein the ionospheric noise model is or comprises an ionospheric delay state noise model.

E6. Method according to any one of embodiments E1 to E5, wherein the ionospheric noise model is or comprises an ionospheric noise model specific to a NSS satellite.

E7. Method according to any one of embodiments E1 to E6, wherein the ionospheric noise model is or comprises a Gauss-Markov noise model.

E8. Method of embodiment E7, wherein
the Gauss-Markov noise model is parametrized by a correlated noise and a correlation time, and
adapting the ionospheric noise model comprises modifying at least one of: the correlated noise and the correlation time.

E9. Method of embodiment E8, wherein adapting (s60) the ionospheric noise model comprises at least one of:
increasing the correlated noise; and
decreasing the correlation time.

E10. Method according to any one of embodiments E1 to E9, wherein obtaining (s40) the ionospheric disturbance information comprises one of:
receiving, from a reference station or reference station system, the ionospheric disturbance information; and
obtaining, within the NSS receiver or processing entity capable of receiving data from the NSS receiver, the ionospheric disturbance information after generating it on the NSS receiver or processing entity based on data from a reference station or reference station system.

E11. System (2000) comprising at least one of a navigation satellite system receiver, hereinafter abbreviated as "NSS receiver", and a processing entity capable of receiving data from the NSS receiver, the system being for estimating parameters useful to determine a position, the NSS receiver observing NSS signals from NSS satellites, and the system (2000) being configured for:
operating at least one estimation process, each estimation process being hereinafter referred to as "NSS estimator" and the at least one NSS estimator being hereinafter referred to as "NSS estimator set", wherein each NSS estimator uses state variables and computes values of its state variables based on at least one of: NSS signals observed by the NSS receiver, and information derived from the NSS signals;
obtaining ionospheric disturbance information comprising at least one of: ionospheric scintillation information and ionospheric gradient information;
determining that the ionospheric disturbance information indicates an ionospheric disturbance level exceeding a threshold; and,
for at least one NSS estimator of the NSS estimator set, performing at least one of a first operation and a second operation, wherein the first operation comprises:
adapting an ionospheric noise model of the NSS estimator based on the ionospheric disturbance information; or
switching the NSS estimator to ionospheric free observations; and
the second operation comprises:
adapting an observation noise model of the NSS estimator based on the ionospheric disturbance information.

E12. Vehicle comprising a system (2000) according to embodiment E11, the vehicle preferably being at least one of: a motor vehicle, an agricultural tractor, a combine harvester, a crop sprayer, a construction equipment, a truck, a bus, a train, a motorcycle, an autonomous vehicle, a self-driving vehicle, a driverless vehicle, a robotic vehicle, a highly automated vehicle, an aircraft, and an unmanned aerial vehicle.

E13. Computer program or set of computer programs comprising computer-readable instructions configured, when executed on a computer or set of computers, to cause the computer or set of computers to carry out the method according to any one of embodiments E1 to E10.

E14. Computer program product or storage mediums comprising a computer program or set of computer programs according to embodiment E13.

Abbreviations amp amplitude
APC antenna phase center
BDS BeiDou Navigation Satellite System
BRT Brasilia Time
C/A coarse/acquisition (code)

CD compact disc
CD-ROM compact disk-read only memory
CPU central processing unit
DVD digital versatile disc
GBAS Ground-Based Augmentation System
GNSS global navigation satellite system
GPS Global Positioning System
I/O input/output
iono ionospheric or ionosphere
IP Internet Protocol
IPP ionospheric pierce point
LMS least mean squares
NAVIC NAVigation with Indian Constellation
NSS navigation satellite system
obs observation
ppm part(s) per million
PPP precise point positioning
PRN pseudo-random noise
QZSS Quasi-Zenith Satellite System
RAM random-access memory
ref. reference
refs. references
RMS root mean square
RNSS regional navigation satellite system
ROM read-only memory
RTCM Radio Technical Commission for Maritime Services
RTK real-time kinematic
scint scintillation
SSD solid-state disk
TEC total electron content
TID travelling ionospheric disturbance
VRS virtual reference station

REFERENCES

[1] Hofmann-Wellenhof, B., et al., "GNSS, Global Navigation Satellite Systems, GPS, GLONASS, Galileo, & more", Springer-Verlag Wien, 2008.
[2] EP 3 035 080 A1 titled "Navigation satellite system positioning involving the generation of correction information" (Trimble ref.: A4396).
[3] Jan Van Sickle, "Two Types of Observables|GEOG 862: GPS and GNSS for Geospatial Professionals", John A. Dutton e-Education Institute, College of Earth and Mineral Sciences, The Pennsylvania State University, retrieved from https://www.e-education.psu.edu/geog862/node/1752 on Nov. 8, 2021.
[4] Pi, X., et al. "Monitoring of global ionospheric irregularities using the worldwide GPS network." *Geophysical Research Letters* 24.18 (1997): 2283-2286.
[5] Zhizhao, L. I. U., and W. U. Chen. "Study of the ionospheric TEC rate in Hong Kong region and its GPS/GNSS application." *Global Navigation Satellite System: Technology Innovation and Application* (CPGPS 2009); NAV Technology Co., Ltd.: Beijing, China (2009): 129-137.
[6] Cherniak, Iurii, Andrzej Krankowski, and Irina Zakharenkova. "Observation of the ionospheric irregularities over the Northern Hemisphere: Methodology and service." *Radio Science* 49.8 (2014): 653-662.
[7] Nguyen, Viet Khoi, et al. "Measuring phase scintillation at different frequencies with conventional GNSS receivers operating at 1 Hz." *Journal of Geodesy* 93 (2019): 1985-2001.
[8] Luo, Xiaomin, et al. "Amplitude scintillation index derived from C/No measurements released by common geodetic GNSS receivers operating at 1 Hz." *Journal of Geodesy* 94.2 (2020): 27.
[9] Wanninger, Lambert. "Ionospheric disturbance indices for RTK and network RTK positioning." *Proceedings of the 17th International Technical Meeting of the Satellite Division of The Institute of Navigation (ION GNSS 2004)*. 2004.
[10] Lee, Jinsil, and Jiyun Lee. "Correlation between ionospheric spatial decorrelation and space weather intensity for safety-critical differential GNSS systems." *Sensors* 19.9 (2019): 2127.
[11] Caamano, Maria, et al. "Network-based ionospheric gradient monitoring to support GBAS." *Navigation* 68.1 (2021): 135-156.
[12] Chang, Hyeyeon, et al. "Ionospheric spatial decorrelation assessment for GBAS daytime operations in Brazil." *Navigation* 68.2 (2021): 391-404.
[13] Marini-Pereira, Leonardo, Alison de Oliveira Moraes, and Sam Pullen. "A Simple and Effective Approach to Real-Time Ionospheric Monitoring for GBAS in Low Latitudes." *Proceedings of the 35th International Technical Meeting of the Satellite Division of The Institute of Navigation (ION GNSS+ 2022)*. 2022.
[14] Supriadi, Slamet, et al. "Construction of nominal ionospheric gradient using satellite pair based on GNSS CORS observation in Indonesia." *Earth, Planets and Space* 74.1 (2022): 71.
[15] EP 3 130 943 A1 titled "Navigation satellite system positioning involving the generation of tropospheric correction information" (Trimble ref.: 15072-EPO).
[16] EP 3 293 549 A1 titled "Advanced navigation satellite system positioning method and system using delayed precise information" (Trimble ref.: 16029-IDF)
[17] Klobuchar, John A. "Ionospheric time-delay algorithm for single-frequency GPS users." *IEEE Transactions on aerospace and electronic systems* 3 (1987): 325-331.
[18] RTCM Special Committee. "RTCM standard 10403.3 differential GNSS (global navigation satellite systems) services-version 3." *RTCM Special Committee* 104 (2016).
[19] Trimble (June 2009). "CMRx: A new correction format from Trimble". White paper, Trimble Navigation Ltd. Retrieved on 17 May 2023 from http://trl.trimble.com/docushare/dsweb/Get/Document-469944/WhitePaper_HeavyHighway_CMRxrev1.pdf.
[20] Zhang, Yixin, et al. "A study on the characteristics of the ionospheric gradient under geomagnetic perturbations." *Sensors* 20.7 (2020): 1805.
[21] Frissell, Nathaniel A., et al. "First observations of large scale traveling ionospheric disturbances using automated amateur radio receiving networks." *Geophysical Research Letters* 49.5 (2022): e2022GL097879.
[22] Woo, K. T. "Optimum semi-codeless carrier phase tracking of L2." *Navigation* 47.2 (2000): 82-99.
[23] U.S. Pat. No. 6,954,488 B1 titled "Method and apparatus for improved L2 performance in dual frequency semi-codeless GPS receivers"

The invention claimed is:
1. Method for computing a positioning solution using station-specific ionospheric disturbance information, the method comprising:
providing ionospheric disturbance information applicable to a region of the Earth and suitable for use by at least one of:

a navigation satellite system, hereinafter abbreviated as "NSS", receiver, and a processing entity capable of receiving data from the NSS receiver, in contributing to computing the positioning solution based on NSS signals received by the NSS receiver from a plurality of NSS satellites, hereinafter referred to as "first set of NSS satellites", wherein providing comprises:

generating, for a point, hereinafter referred to as "station", on or near the surface of the Earth, ionospheric disturbance information, hereinafter referred to as the "station-specific ionospheric disturbance information", comprising at least one of: ionospheric scintillation information and ionospheric gradient information, wherein generating comprises:

computing, for each of a plurality of NSS satellites, hereinafter referred to as "second set of NSS satellites", an ionospheric disturbance level, hereinafter referred to as "satellite-specific ionospheric disturbance level", the second set of NSS satellites being any one of: different from the first set of NSS satellites, partially different from the first set of NSS satellites, and the same as the first set of NSS satellites, and computing a measure of the satellite-specific ionospheric disturbance levels over the second set of NSS satellites, the measure being hereinafter referred to as "ionospheric-disturbance-levels-summarizing measure"; and providing the station-specific ionospheric disturbance information being or comprising the ionospheric-disturbance-levels-summarizing measure; and computing the positioning solution using the station-specific ionospheric disturbance information and the NSS signals received by the NSS receiver.

2. Method of claim 1, wherein the ionospheric-disturbance-levels-summarizing measure is or comprises at least one of:

a mean of the satellite-specific ionospheric disturbance levels over the second set of NSS satellites;

a weighted mean of the satellite-specific ionospheric disturbance levels over the second set of NSS satellites; and a maximum of the satellite-specific ionospheric disturbance levels over the second set of NSS satellites.

3. Method of claim 1, wherein the station-specific ionospheric disturbance information comprises ionospheric scintillation information that comprises ionospheric amplitude scintillation information, wherein computing, for each of the satellites of the second set of NSS satellites, a satellite-specific ionospheric disturbance level comprises:

computing, for each of the satellites of the second set of NSS satellites, a satellite-specific amplitude scintillation level based on a channel carrier-to-noise-density ratio rate of change associated with the satellite, for ionospheric amplitude scintillation detection; and computing an ionospheric-disturbance-levels-summarizing measure comprises:

computing a measure of the satellite-specific amplitude scintillation levels over the second set of NSS satellites, the measure being hereinafter referred to as "amplitude-scintillation-levels-summarizing measure", wherein, preferably, the amplitude-scintillation-levels-summarizing measure is or comprises at least one of:

a mean of the satellite-specific amplitude scintillation levels over the second set of NSS satellites;

a weighted mean of the satellite-specific amplitude scintillation levels over the second set of NSS satellites; and a maximum of the satellite-specific amplitude scintillation levels over the second set of NSS satellites.

4. Method of claim 3, wherein NSS signals on more than one NSS frequency, hereinafter referred to as "NSS channel", are received from each of at least some of the satellites, hereinafter referred to as "multi-channel satellites", of the second set of NSS satellites and, for each multi-channel satellite, computing the channel carrier-to-noise-density ratio rate of change comprises:

computing a carrier-to-noise-density ratio rate of change for each NSS channel; and computing a mean carrier-to-noise-density ratio rate of change over all computed carrier-to-noise-density ratio rate of changes.

5. Method of claim 3, wherein the channel carrier-to-noise-density ratio rate of change is a m Hz mean channel carrier-to-noise-density ratio rate of change, wherein m is a number selected within the range from 0.5 to 200, preferably a number selected within the range from 1 to 100, most preferably any one of 1, 2, 5, 10, 20, 50, and 100.

6. Method of claim 5, wherein computing, for a satellite, the satellite-specific amplitude scintillation level comprises:

computing, for each channel received from the satellite, a carrier-to-noise-density rate of change from an epoch T−ΔT to an epoch T, where ΔT is equal to 1/m second;

computing the m Hz mean channel carrier-to-noise-density ratio rate of change by computing a mean of the carrier-to-noise-density rates of change over all channels;

adding the m Hz mean channel carrier-to-noise-density ratio rate of change to a n-second moving window; and computing the root mean square of all values in the n-second moving window to obtain the satellite-specific amplitude scintillation level, wherein n is a number selected within the range from 10 to 240, preferably a number selected within the range from 30 to 120.

7. Method according to claim 1, wherein the station-specific ionospheric disturbance information comprises ionospheric scintillation information that comprises ionospheric phase scintillation information, wherein computing, for each of the satellites of the second set of NSS satellites, a satellite-specific ionospheric disturbance level comprises:

computing, for each of the satellites of the second set of NSS satellites, a satellite-specific phase scintillation level based on a channel pair ionospheric delay rate of change associated with the satellite, for ionospheric phase scintillation detection; and computing an ionospheric-disturbance-levels-summarizing measure comprises:

computing a measure of the satellite-specific phase scintillation levels over the second set of NSS satellites, the measure being hereinafter referred to as "phase-scintillation-levels-summarizing measure", wherein, preferably, the phase-scintillation-levels-summarizing measure is or comprises at least one of:

a mean of the satellite-specific phase scintillation levels over the second set of NSS satellites;

a weighted mean of the satellite-specific phase scintillation levels over the second set of NSS satellites; and a maximum of the satellite-specific phase scintillation levels over the second set of NSS satellites.

8. Method of claim 7, wherein NSS signals on more than two NSS frequencies, hereinafter referred to as "NSS channel", are received from each of at least some of the satellites, hereinafter referred to as "three-or-more-channel satellites", of the second set of NSS satellites and, for the three-or-more-channel satellites, computing the channel pair ionospheric delay rate of change comprises:

computing an ionospheric delay rate of change for each possible pair of NSS channels; and computing a mean ionospheric delay rate of change over all computed ionospheric delay rate of changes.

9. Method of claim 7, wherein the channel pair ionospheric delay rate of change is a p Hz mean channel pair ionospheric delay rate of change, wherein p is a number selected within the range from 0.5 to 200, preferably a number selected within the range from 1 to 100, most preferably any one of 1, 2, 5, 10, 20, 50, and 100.

10. Method of claim 9, wherein computing, for a satellite, the satellite-specific phase scintillation level comprises:

computing, for each pair of channels received from the satellite, an ionospheric delay rate of change using carrier phase observations from the signals from the pair of channels from an epoch $T-\Delta T$ to an epoch T, where $\Delta T$ is equal to $1/p$ second;

computing the p Hz mean pair ionospheric delay rate of change by computing a mean of the ionospheric delay rate of changes over all pairs of channels;

adding the p Hz mean channel carrier-to-noise-density ratio rate of change to a q-second moving window; and computing the root mean square of all values in the q-second moving window to obtain the satellite-specific phase scintillation level, wherein q is a number selected within the range from 10 to 240, preferably a number selected within the range from 30 to 120.

11. Method according to claim 1, wherein the station-specific ionospheric disturbance information comprises ionospheric gradient information that comprises ionospheric delay gradient information, wherein computing, for each of the satellites of the second set of NSS satellites, a satellite-specific ionospheric disturbance level comprises:

computing, for each of the satellites of the second set of NSS satellites, a satellite-specific ionospheric gradient level based on:

determining a difference, hereinafter referred to as "time-differenced ionospheric delay", between an ionospheric delay at a first point in time and an ionospheric delay at a second point in time; and dividing the time-differenced ionospheric delay by a distance between an ionospheric pierce point applicable at the first point in time and an ionospheric pierce point applicable at the second point in time; and computing an ionospheric-disturbance-levels-summarizing measure comprises:

computing a measure of the satellite-specific ionospheric gradient levels over the second set of NSS satellites, the measure being hereinafter referred to as "ionospheric-gradient-levels-summarizing measure", wherein, preferably, the ionospheric-gradient-levels-summarizing measure is or comprises at least one of:

a mean of the satellite-specific ionospheric gradient levels over the second set of NSS satellites;

a weighted mean of the satellite-specific ionospheric gradient levels over the second set of NSS satellites; and a maximum of the satellite-specific ionospheric gradient levels over the second set of NSS satellites.

12. Method of claim 11, wherein the first point in time and the second point in time are separated by r seconds, wherein r is a number selected within the range from 10 to 240, preferably a number selected within the range from 30 to 180, most preferably any one of 30, 60, 120, and 180.

13. Method according to claim 1, wherein providing the station-specific ionospheric disturbance information comprises one of:

sending, from a reference station or reference station system, the station-specific ionospheric disturbance information after generating it on the reference station or reference station system; and providing, within a NSS receiver or NSS receiver system, the station-specific ionospheric disturbance information after generating it on the NSS receiver or NSS receiver system based on data from a reference station or reference station system.

14. Method of claim 13, wherein providing the station-specific ionospheric disturbance information comprises:

sending, from a reference station or reference station system, the station-specific ionospheric disturbance information and the satellite-specific ionospheric disturbance levels after generating them on the reference station or reference station system.

15. Method according to claim 1, wherein one of the following applies:

the region is one of an equatorial region and a polar region and generating station-specific ionospheric disturbance information comprises generating ionospheric scintillation information and ionospheric gradient information; and the region is neither an equatorial region nor a polar region and generating station-specific ionospheric disturbance information comprises generating ionospheric gradient information and does not comprise generating ionospheric scintillation information.

16. A system comprising:

one or more processors; and a memory coupled to the one or more processors, the memory storing instructions that, when executed by the one or more processors, cause the one or more processors to:

provide ionospheric disturbance information applicable to a region of the Earth and suitable for use by at least one of:

a navigation satellite system, hereinafter abbreviated as "NSS", receiver, and a processing entity capable of receiving data from the NSS receiver, in contributing to computing a positioning solution based on NSS signals received by the NSS receiver from a plurality of NSS satellites, hereinafter referred to as "first set of NSS satellites", wherein providing comprises:

generating, for a point, hereinafter referred to as "station", on or near the surface of the Earth, ionospheric disturbance information, hereinafter referred to as "station-specific ionospheric disturbance information", comprising at least one of: ionospheric scintillation information and ionospheric gradient information, wherein generating comprises:

computing, for each of a plurality of NSS satellites, hereinafter referred to as "second set of NSS satellites", an ionospheric disturbance level, hereinafter referred to as "satellite-specific ionospheric disturbance level", the second set of NSS satellites being any one of: different from the first set of NSS satellites, partially different from the first set of NSS satellites, and the same as the first set of NSS satellites, and computing a measure of the satellite-specific ionospheric disturbance levels over the second set of NSS satellites, the measure being hereinafter referred to as "ionospheric-disturbance-levels-summarizing measure"; and providing the station-specific ionospheric disturbance information being or comprising the ionospheric-disturbance-levels-summarizing measure.

17. System of claim 16, wherein providing the station-specific ionospheric disturbance information comprises:

sending, from a reference station or reference station system, the station-specific ionospheric disturbance information and the satellite-specific ionospheric disturbance levels after generating them on the reference station or reference station system.

18. Non-transitory computer readable medium or set of non-transitory computer readable mediums comprising computer-readable instructions configured, when executed on a computer or set of computers, to cause the computer or set of computers to carry out steps comprising:

providing ionospheric disturbance information applicable to a region of the Earth and suitable for use by at least one of:

a navigation satellite system, hereinafter abbreviated as "NSS", receiver, and a processing entity capable of receiving data from the NSS receiver, in contributing to computing a positioning solution based on NSS signals received by the NSS receiver from a plurality of NSS satellites, hereinafter referred to as "first set of NSS satellites", wherein providing comprises:

generating, for a point, hereinafter referred to as "station", on or near the surface of the Earth, ionospheric disturbance information, hereinafter referred to as "station-specific ionospheric disturbance information", comprising at least one of: ionospheric scintillation information and ionospheric gradient information, wherein generating comprises:

computing, for each of a plurality of NSS satellites, hereinafter referred to as "second set of NSS satellites", an ionospheric disturbance level, hereinafter referred to as "satellite-specific ionospheric disturbance level", the second set of NSS satellites being any one of: different from the first set of NSS satellites, partially different from the first set of NSS satellites, and the same as the first set of NSS satellites, and computing a measure of the satellite-specific ionospheric disturbance levels over the second set of NSS satellites, the measure being hereinafter referred to as "ionospheric-disturbance-levels-summarizing measure"; and providing the station-specific ionospheric disturbance information being or comprising the ionospheric-disturbance-levels-summarizing measure.

* * * * *